(12) United States Patent
Lee

(10) Patent No.: US 12,261,972 B2
(45) Date of Patent: Mar. 25, 2025

(54) FLEXIBLE DISPLAY DEVICE

(71) Applicant: LG ELECTRONICS INC., Seoul (KR)

(72) Inventor: Jin Hyung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 233 days.

(21) Appl. No.: 18/020,141

(22) PCT Filed: Oct. 16, 2020

(86) PCT No.: PCT/KR2020/014190
§ 371 (c)(1),
(2) Date: Feb. 7, 2023

(87) PCT Pub. No.: WO2022/080540
PCT Pub. Date: Apr. 21, 2022

(65) Prior Publication Data
US 2023/0291820 A1 Sep. 14, 2023

(51) Int. Cl.
H04M 1/03 (2006.01)
G06F 1/16 (2006.01)
H04M 1/02 (2006.01)

(52) U.S. Cl.
CPC .......... *H04M 1/035* (2013.01); *G06F 1/1624* (2013.01); *G06F 1/1652* (2013.01); *G06F 1/1656* (2013.01); *H04M 1/0237* (2013.01); *H04M 1/0268* (2013.01)

(58) Field of Classification Search
CPC .. H04M 1/035; H04M 1/0237; H04M 1/0268; H04M 1/0235; H04R 1/26; H04R 3/00; H04R 1/222; H04R 1/326; G06F 1/1624; G06F 1/1652; G06F 1/1656; G06F 1/1681; G06F 1/1684; G09F 9/30; G09F 9/301

See application file for complete search history.

(56) References Cited

U.S. PATENT DOCUMENTS

| 10,936,017 | B1* | 3/2021 | Choi | H04M 1/0268 |
| 2017/0347470 | A1* | 11/2017 | Seo | H04B 1/3888 |
| 2019/0302841 | A1 | 10/2019 | Sun et al. | |
| 2020/0213723 | A1 | 7/2020 | Zuo | |

FOREIGN PATENT DOCUMENTS

| KR | 10-2014-0021929 A | 2/2014 |
| KR | 10-2014-0040975 A | 4/2014 |
| KR | 10-2018-0040797 A | 4/2018 |

* cited by examiner

*Primary Examiner* — Tuan D Nguyen
(74) *Attorney, Agent, or Firm* — Birch, Stewart, Kolasch & Birch, LLP

(57) ABSTRACT

A flexible display device is disclosed. The flexible display device may comprise a first body, a second body, a flexible display, a first microphone, a first cavity and a first variable cavity. The first variable cavity is formed to extend from the first cavity and have a volume that varies when the second body moves with respect to the first body. When the second body moves with respect to the first body, the volume of the first variable cavity changes so that resonance frequencies in the first cavity and the first variable cavity can vary. By using the first variable cavity, the sensitivity of the first microphone can be improved and the state of the flexible display device can be identified.

20 Claims, 24 Drawing Sheets

[FIG. 1]
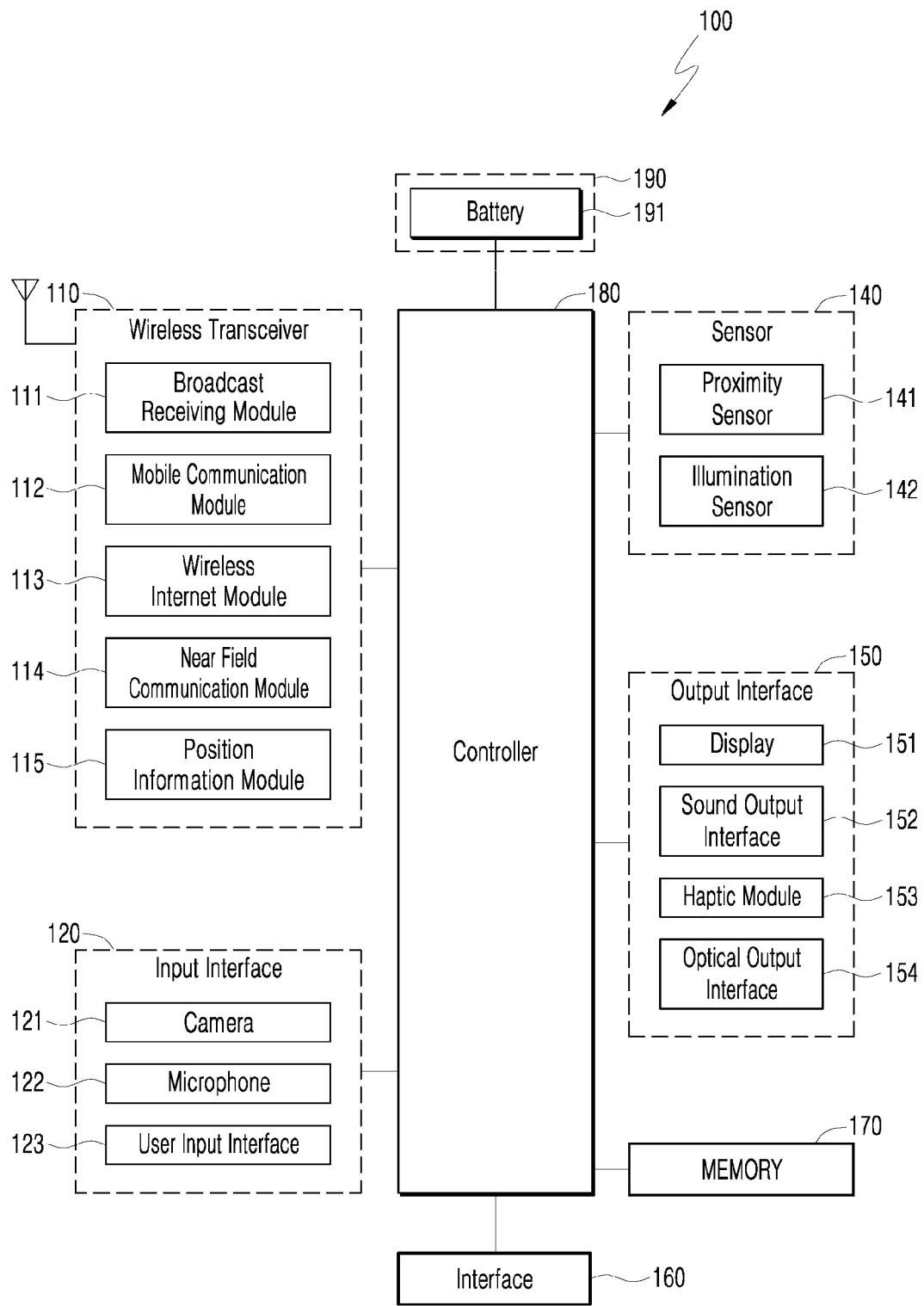

[FIG. 2a]
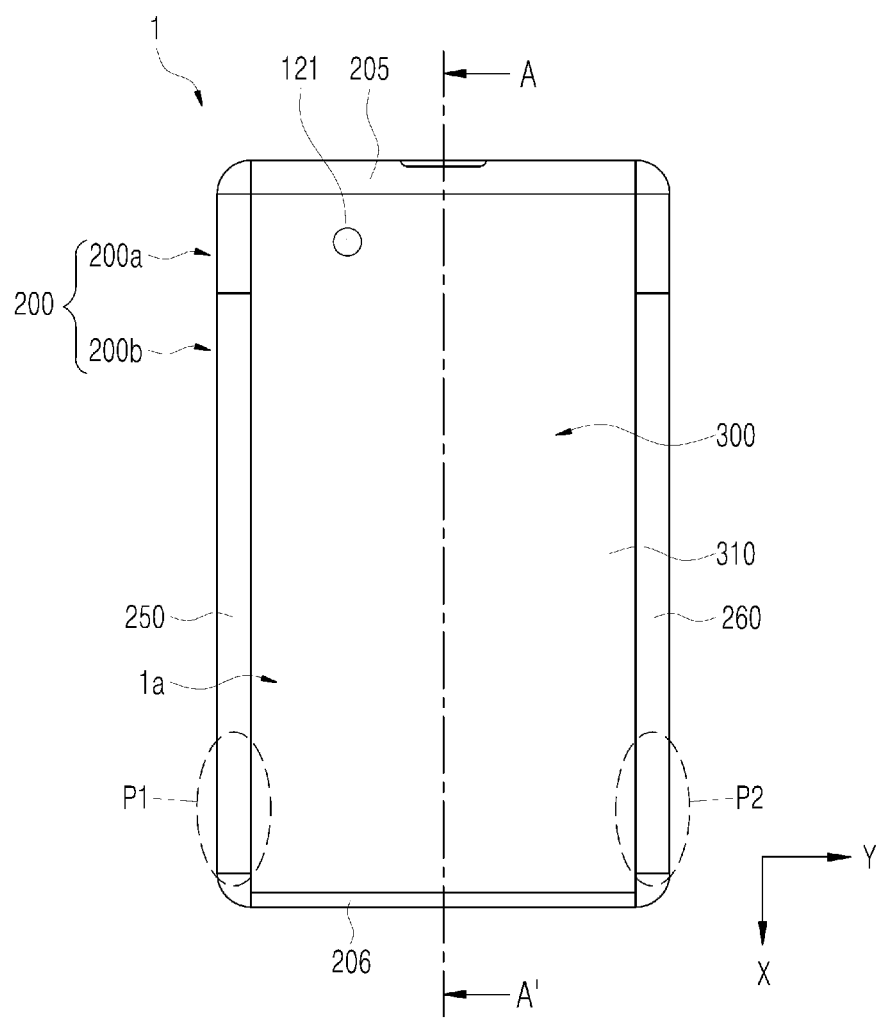

[FIG. 2b]
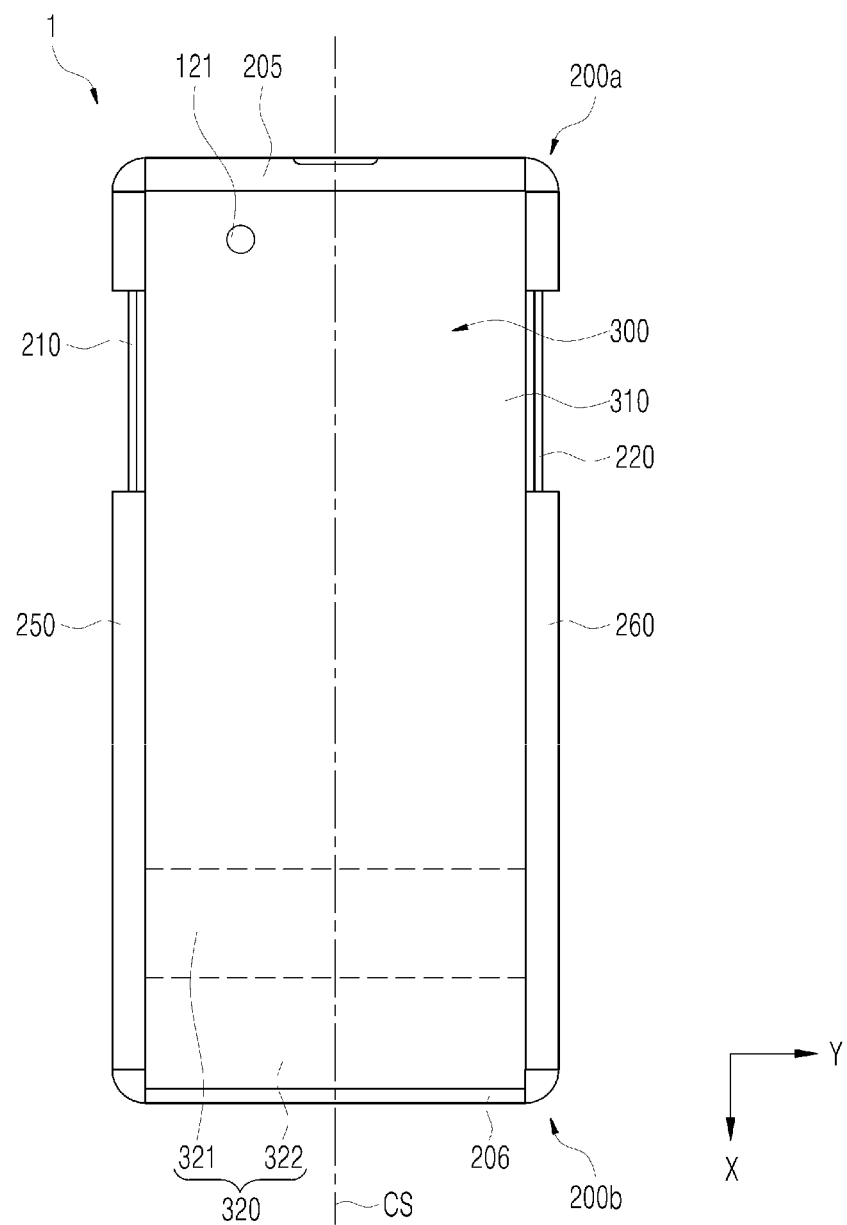

[FIG. 3a]
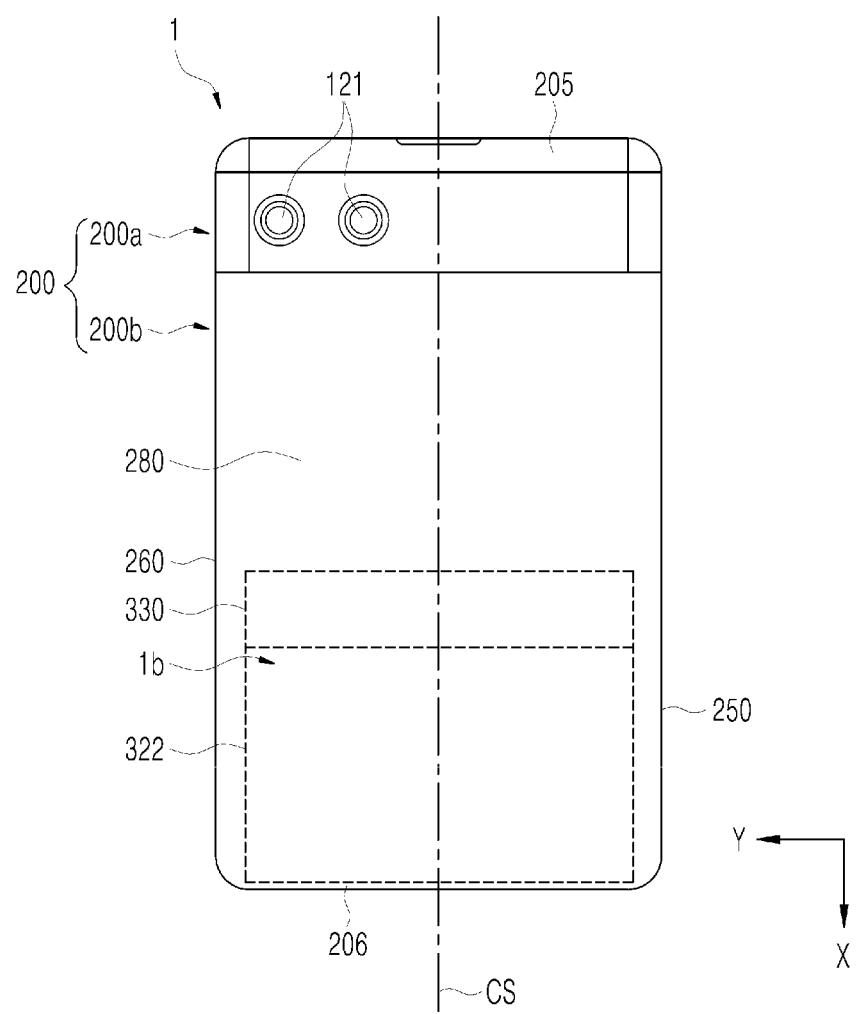

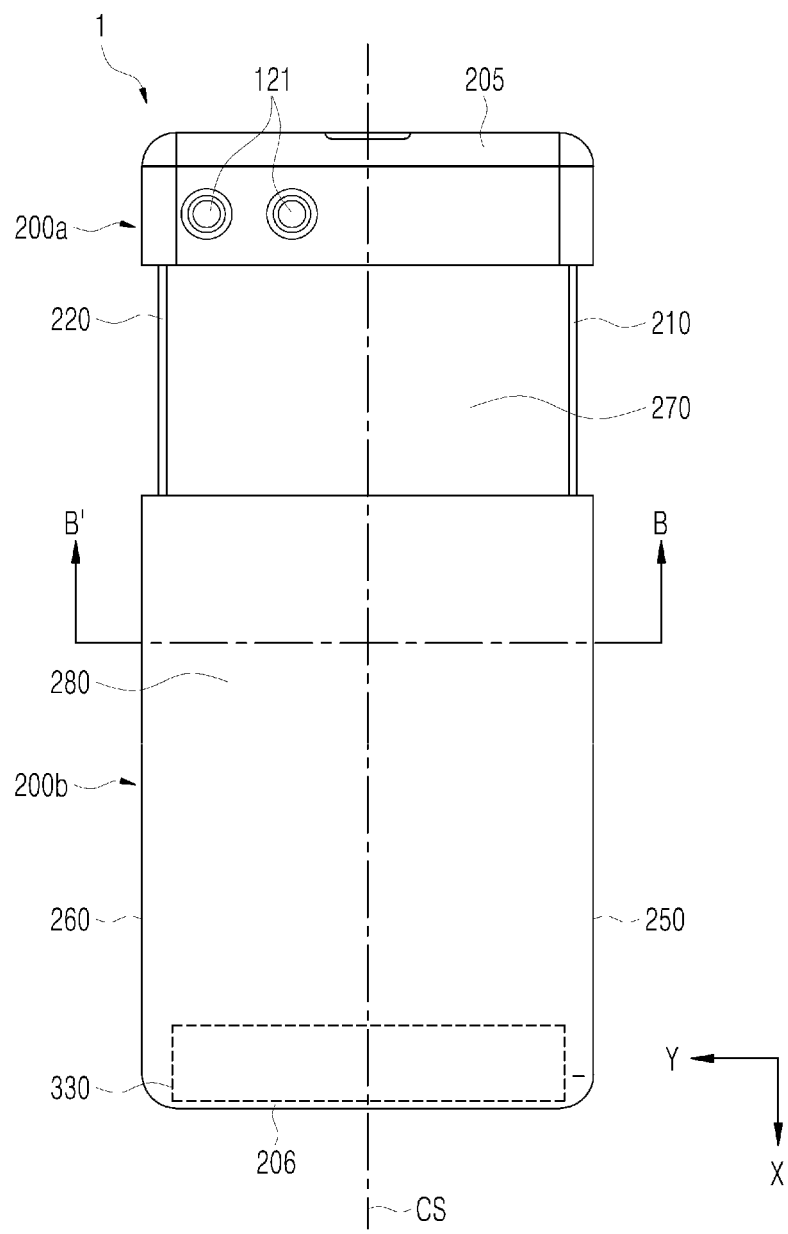
[FIG. 3b]

[FIG. 4]
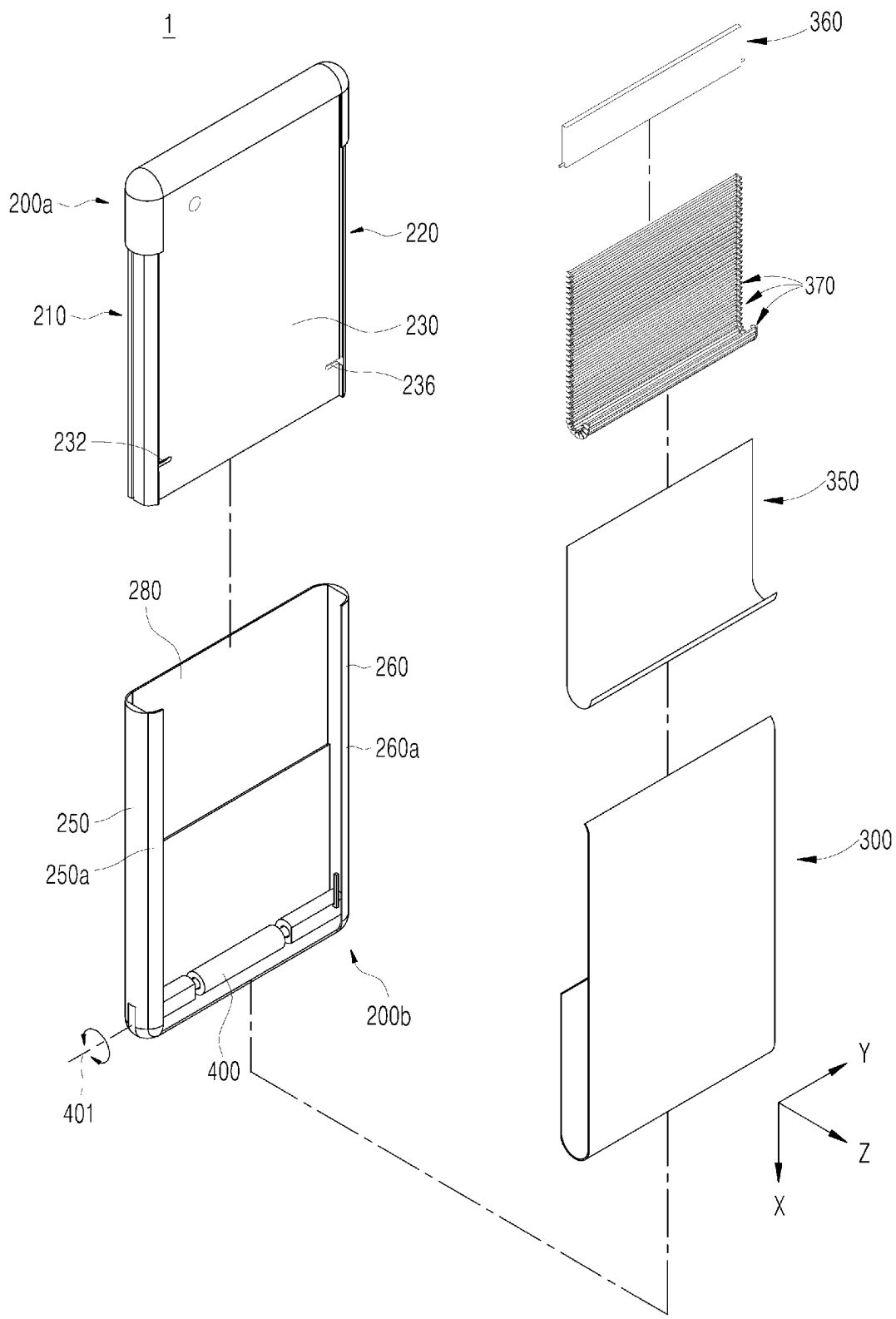

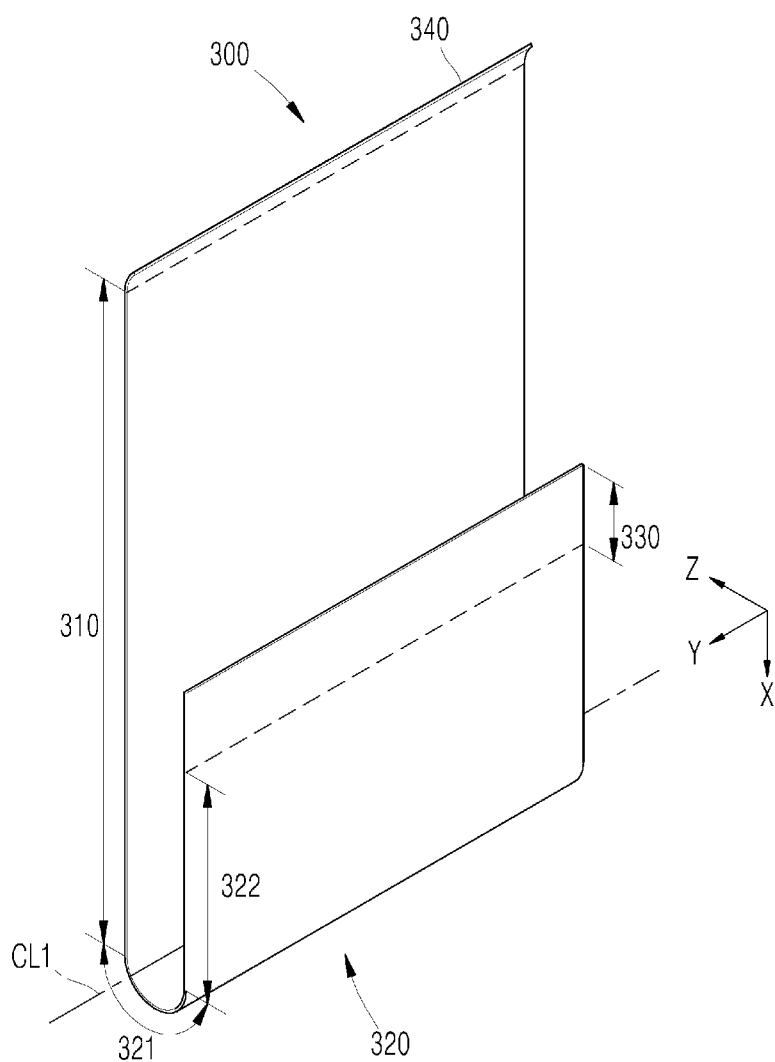
[FIG. 5a]

[FIG. 5b]
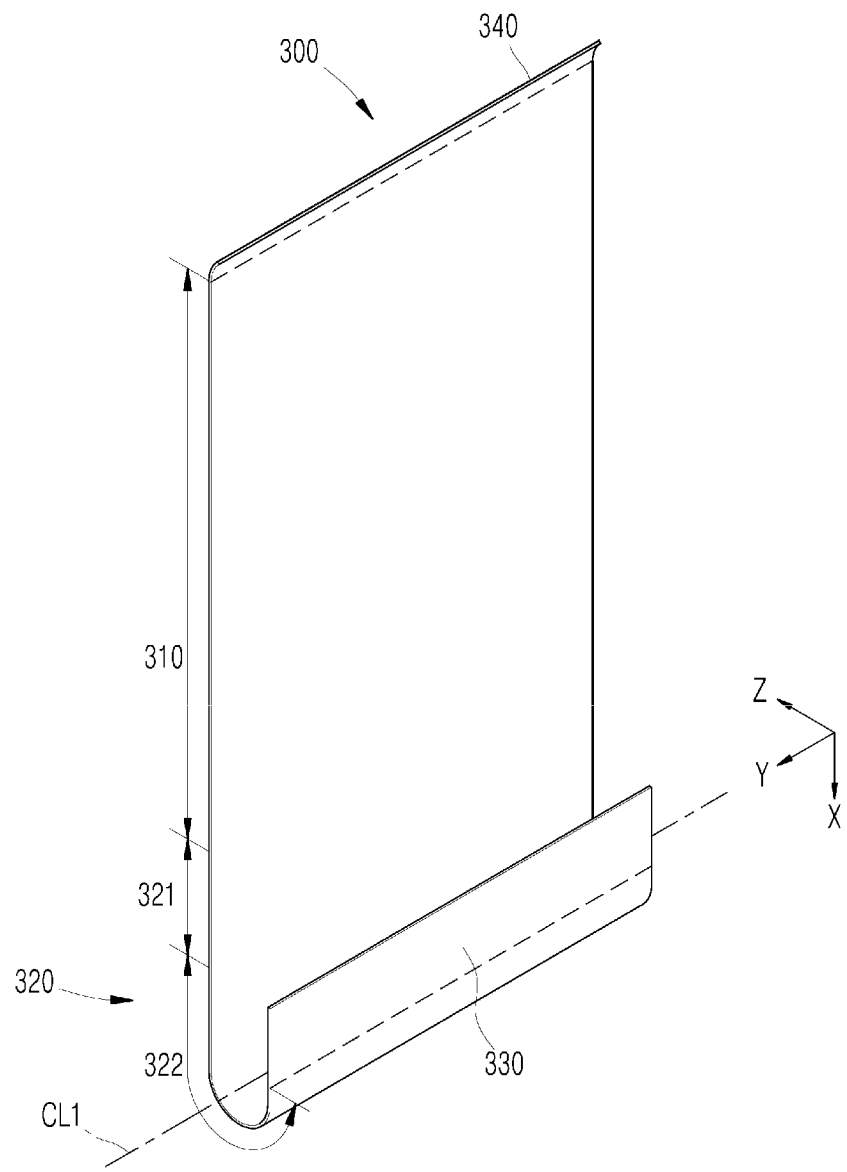

[FIG. 6a]
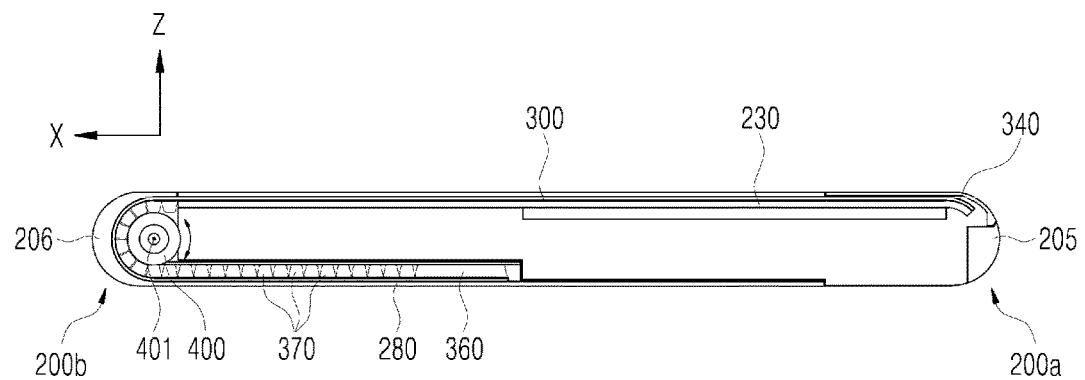
[FIG. 6b]
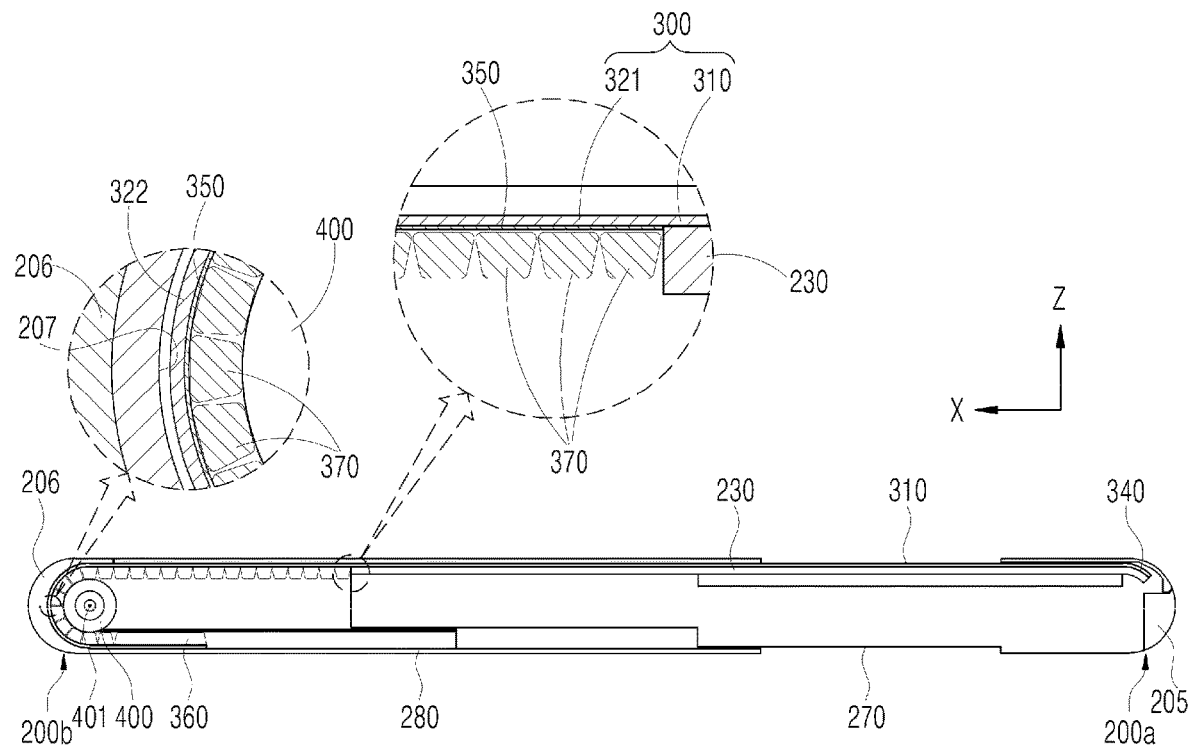

[FIG. 7a]
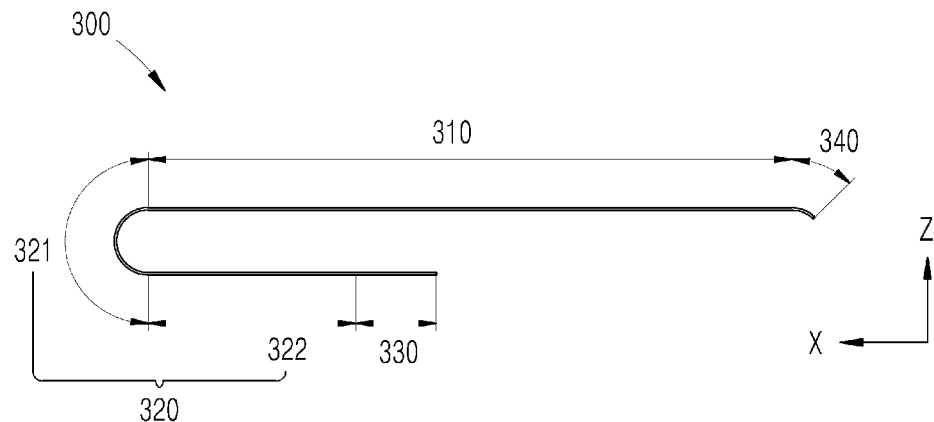
[FIG. 7b]
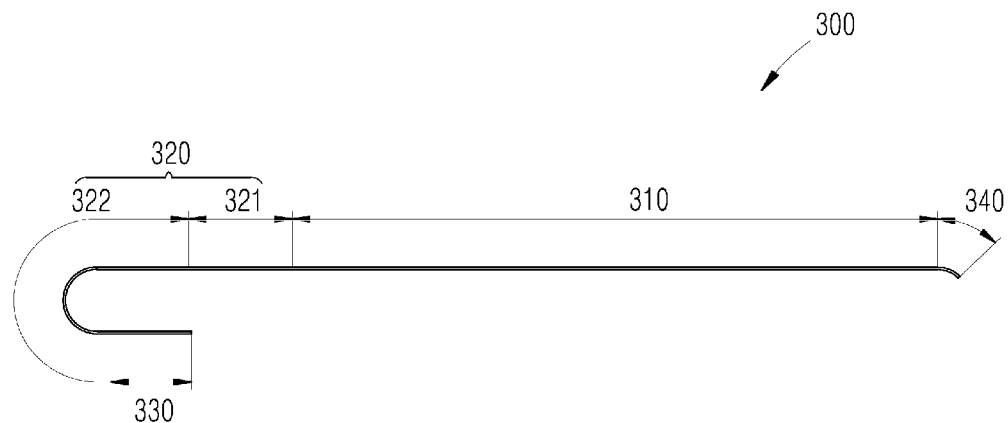
[FIG. 8a]
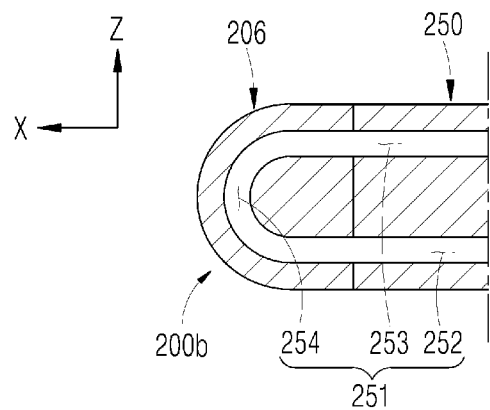

[FIG. 8b]
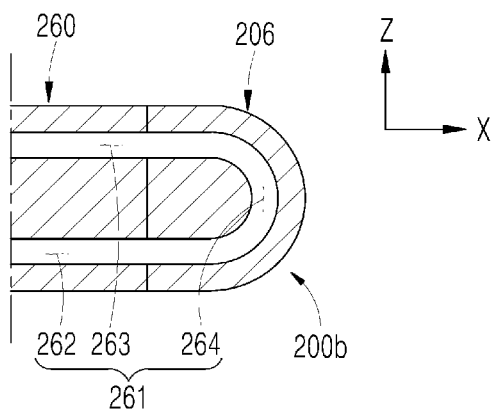
[FIG. 9]
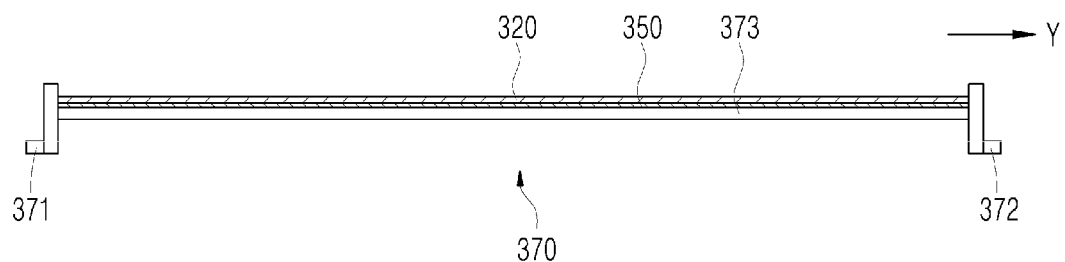

[FIG. 10a]
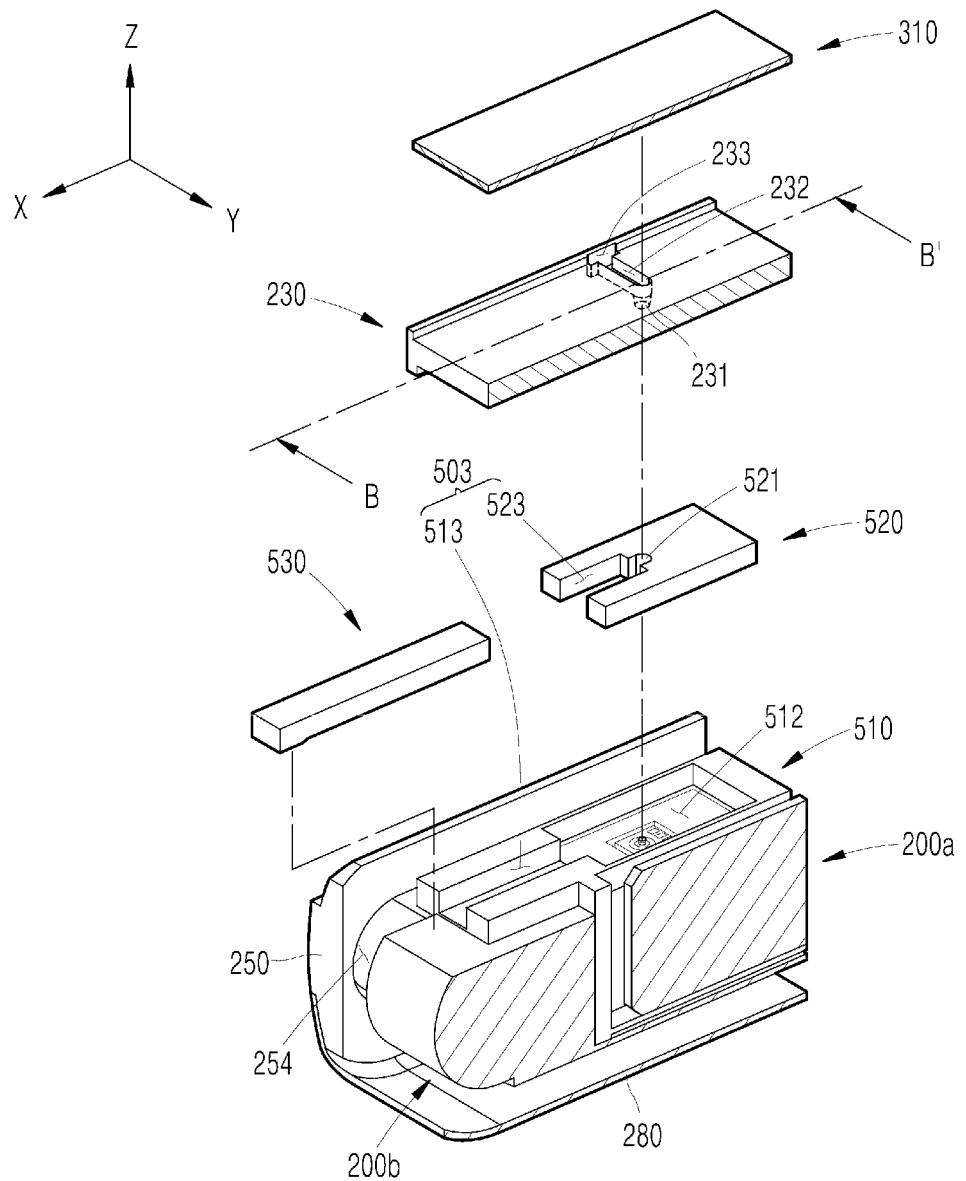

[FIG. 10b]
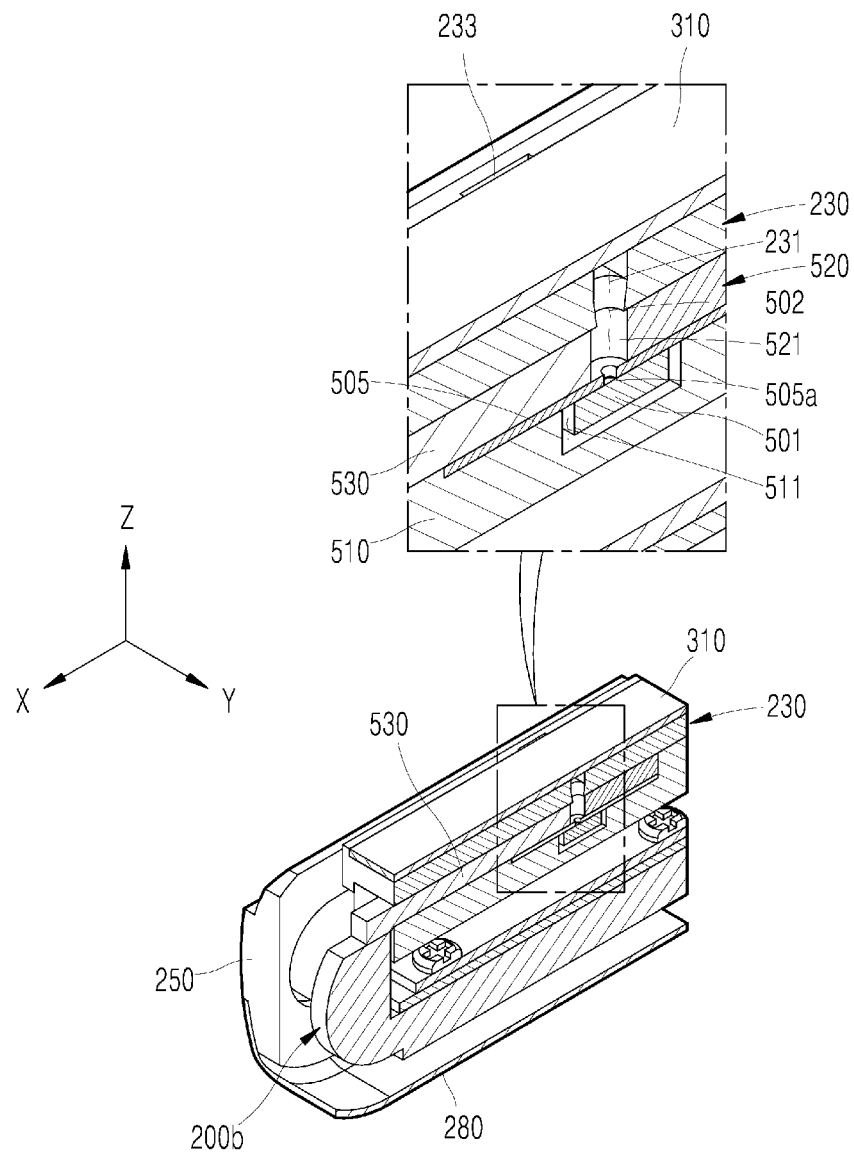

[FIG. 11a]
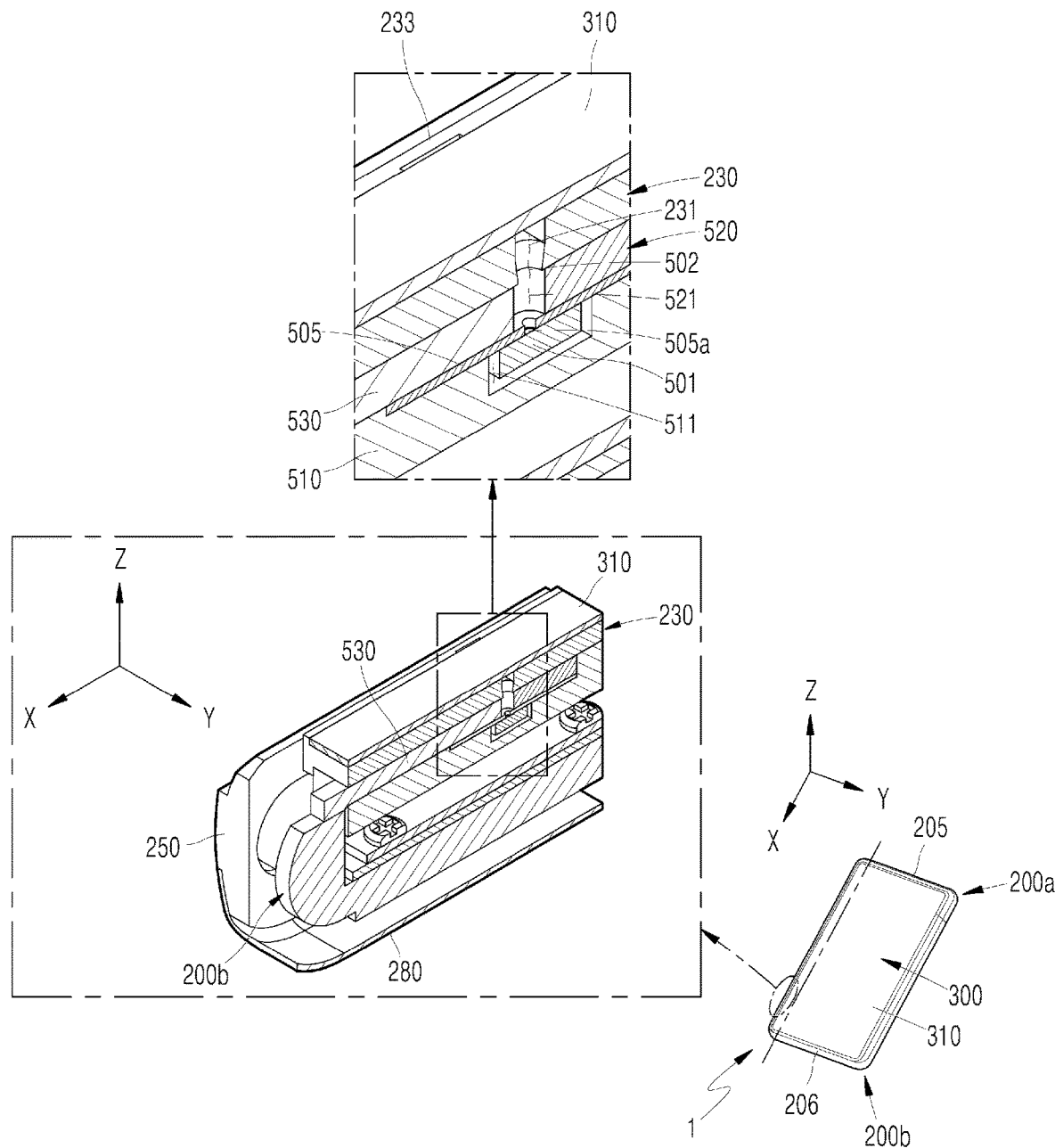

[FIG. 11b]
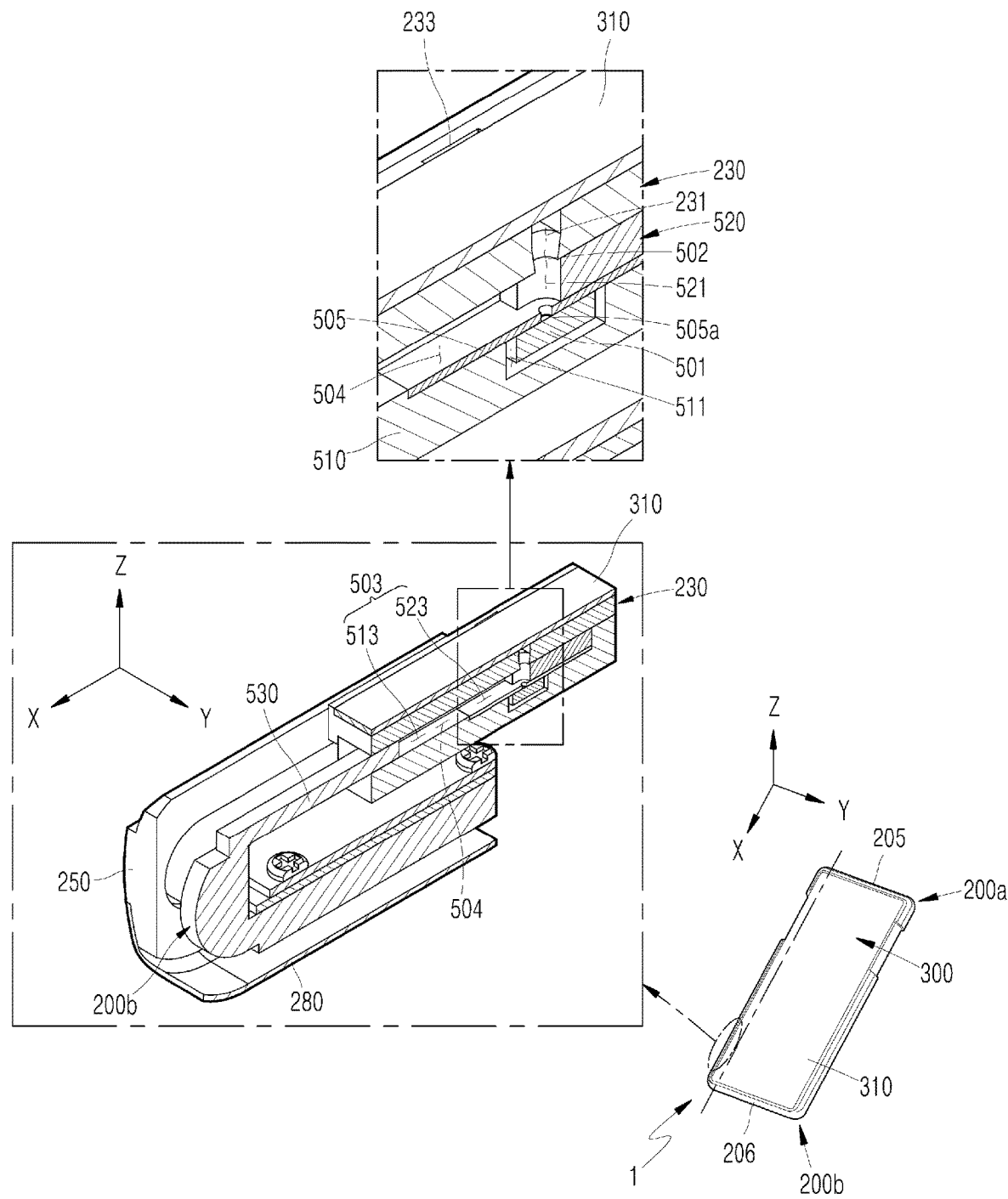

[FIG. 12a]
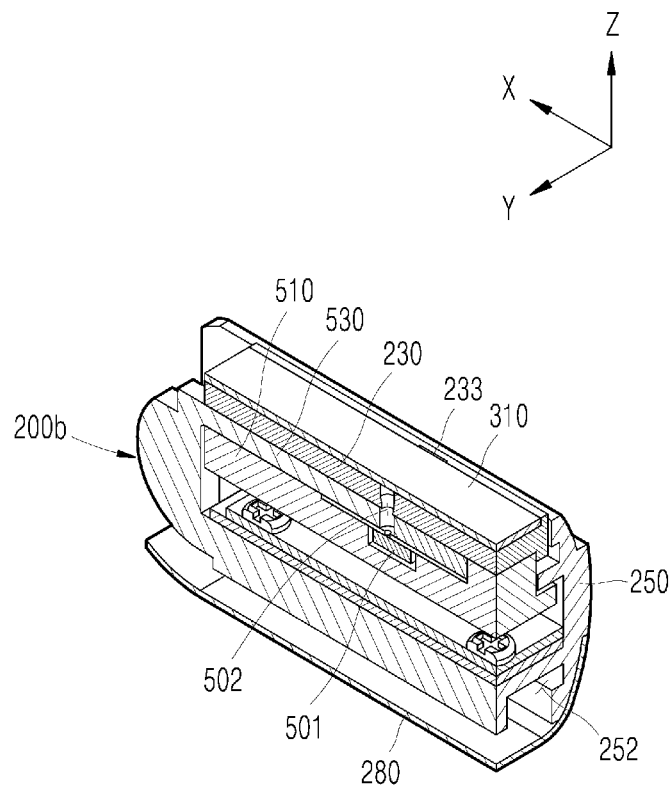
[FIG. 12b]
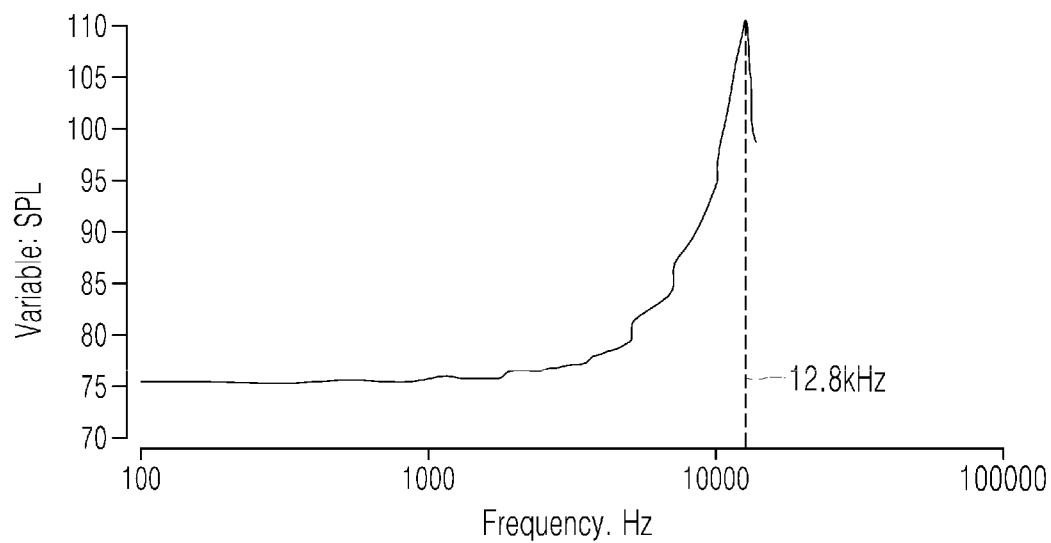

[FIG. 13a]
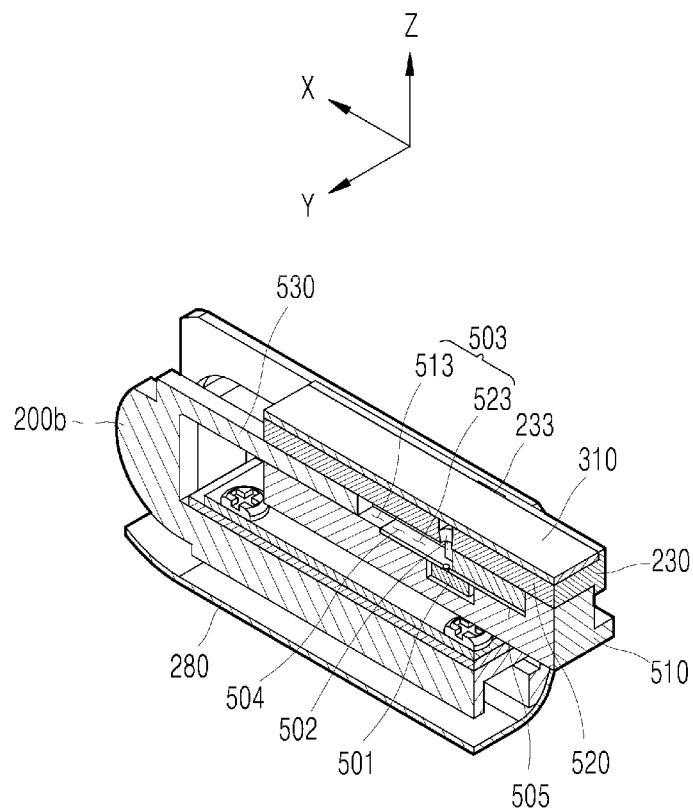
[FIG. 13b]
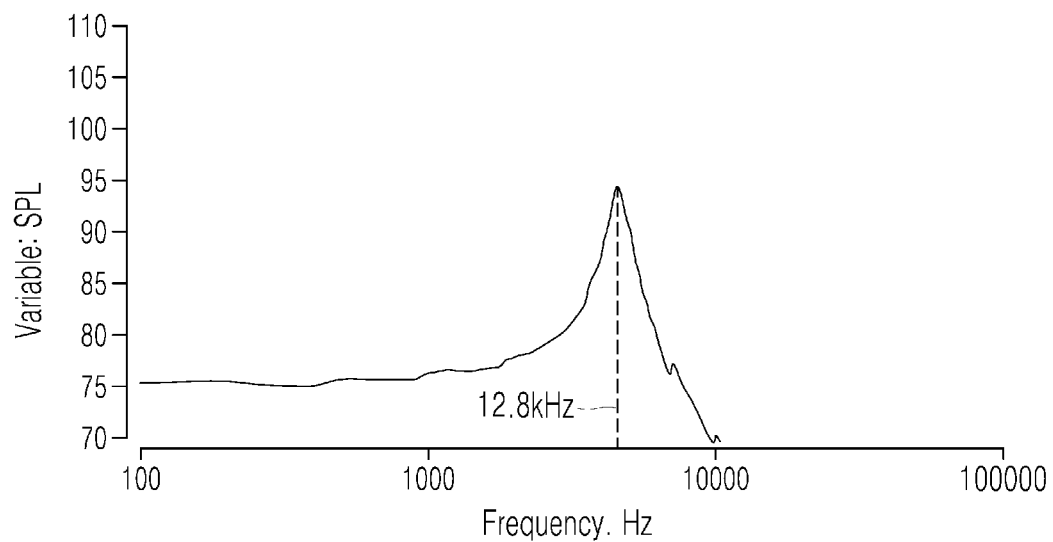

[FIG. 14a]
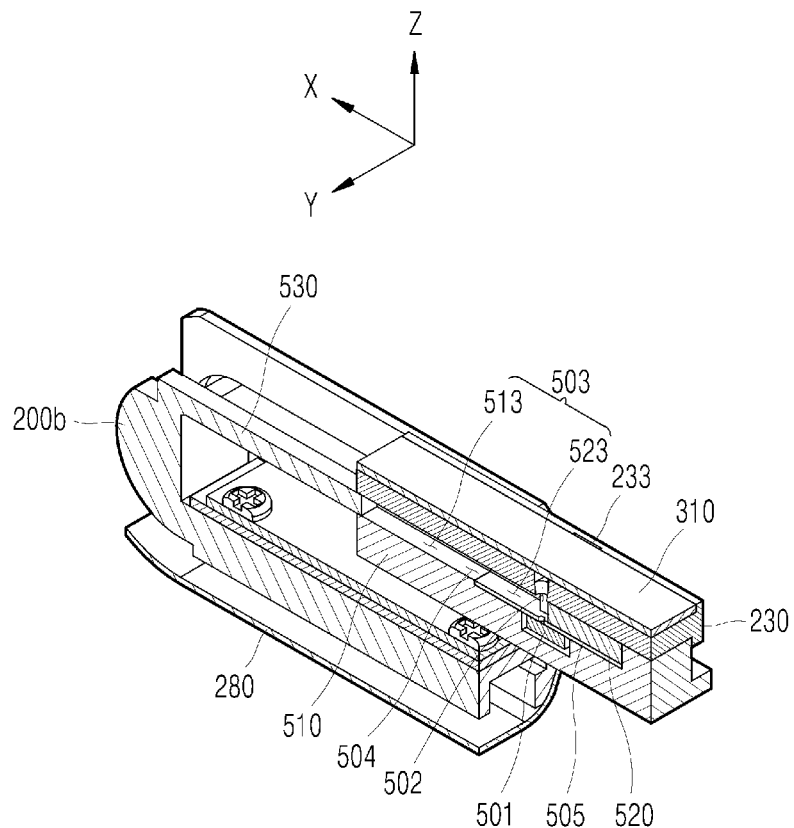
[FIG. 14b]
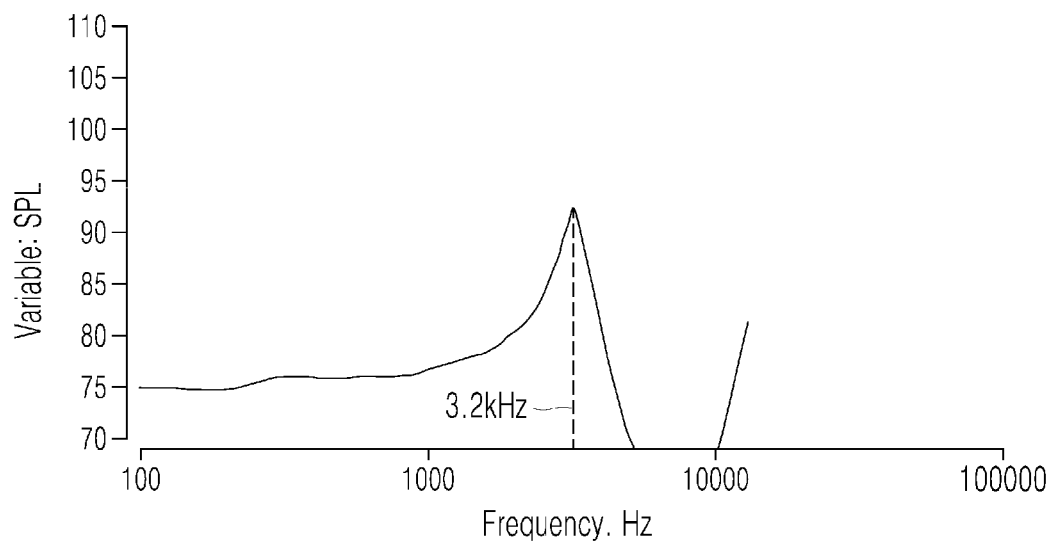

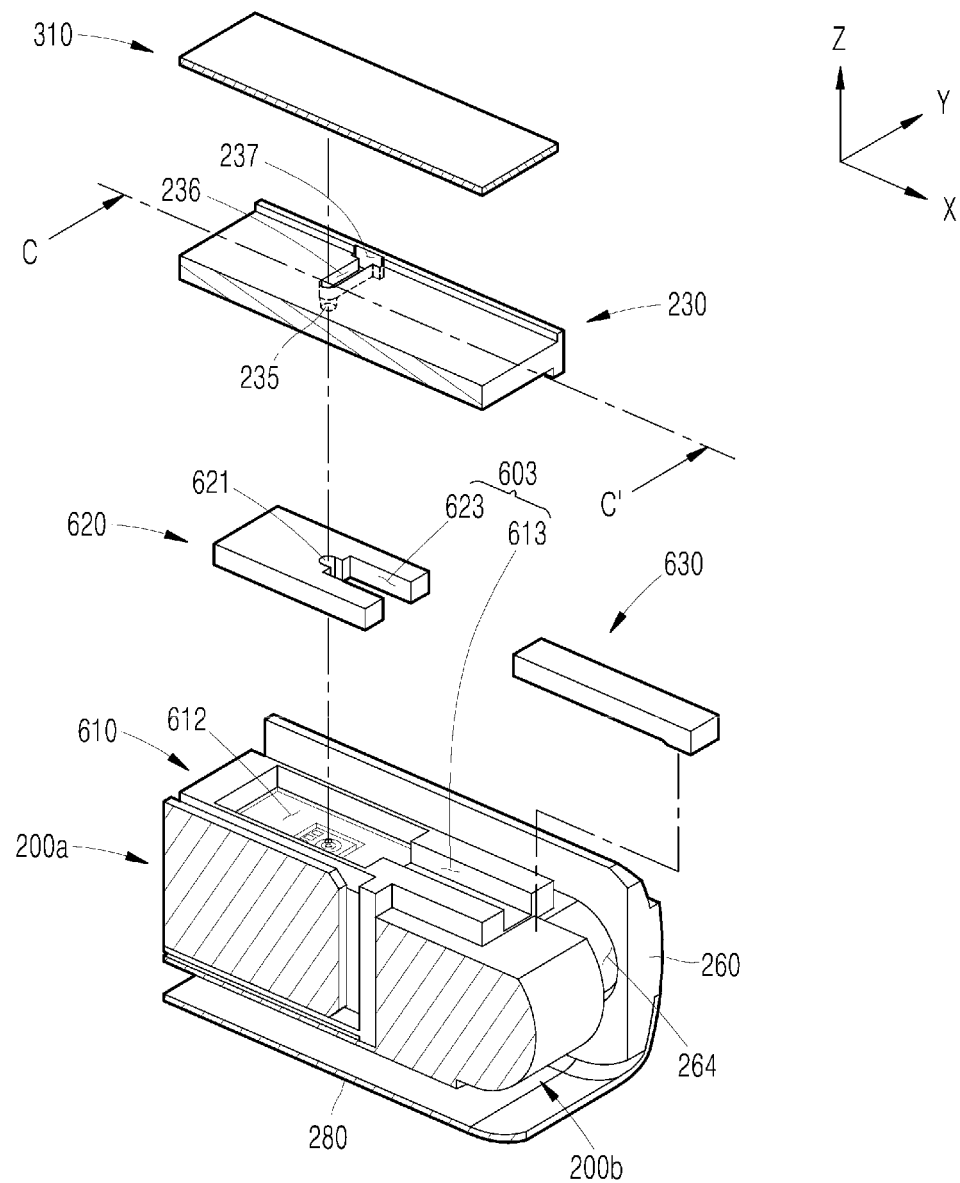
[FIG. 15a]

[FIG. 15b]
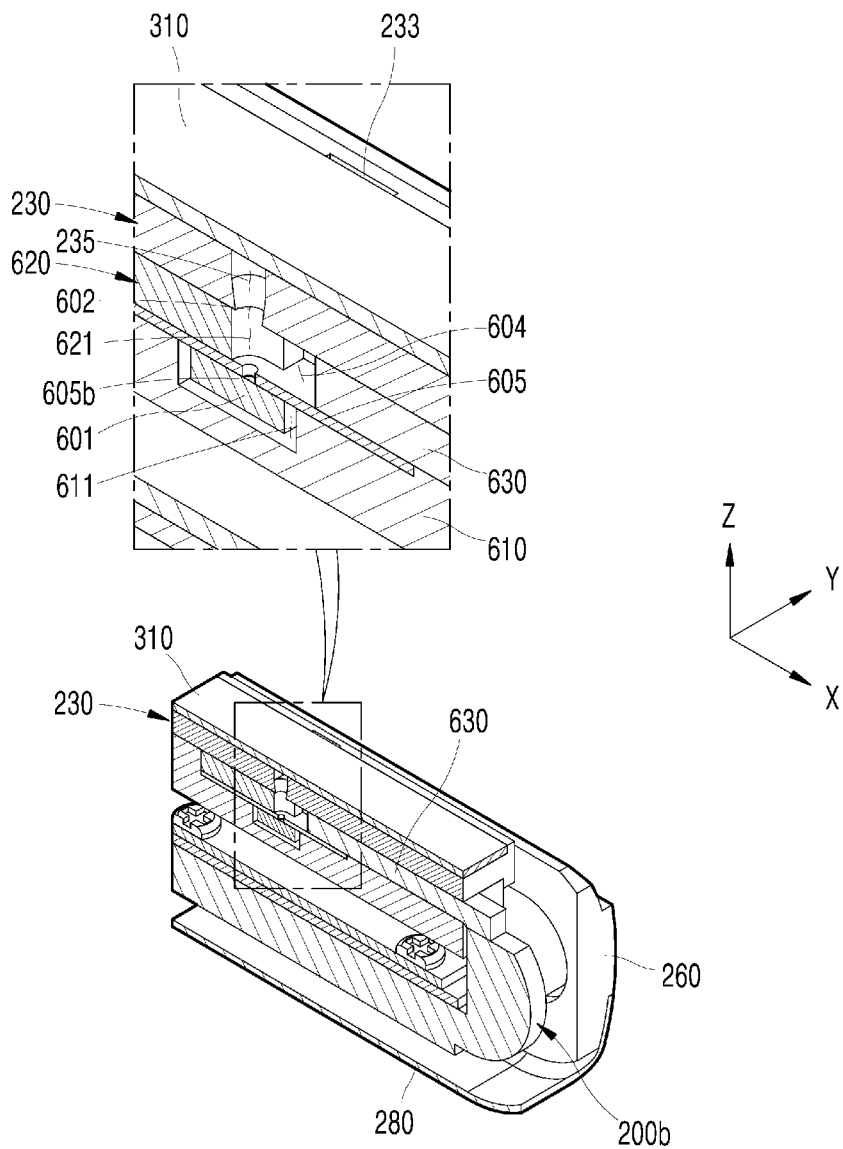

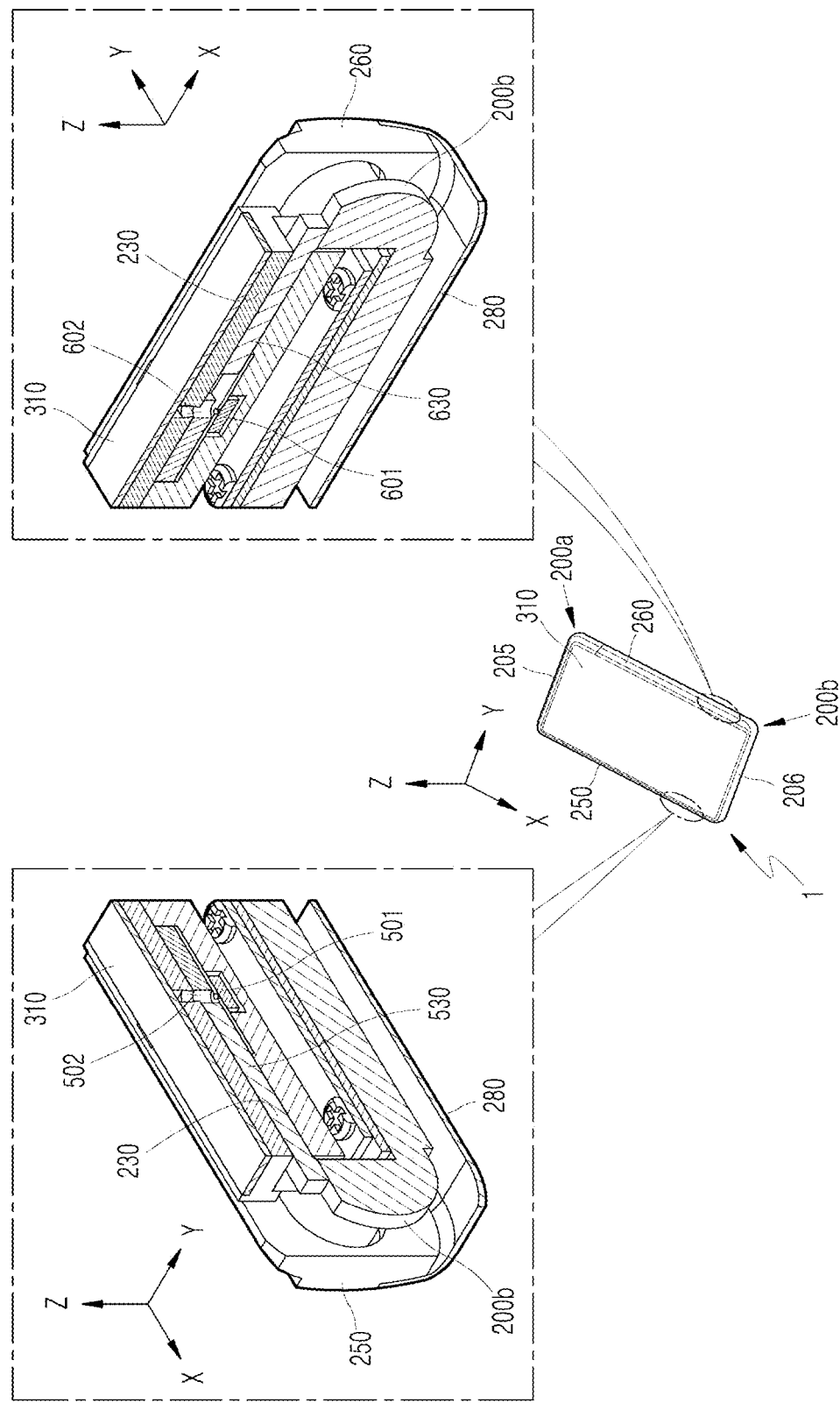

[FIG. 16b]
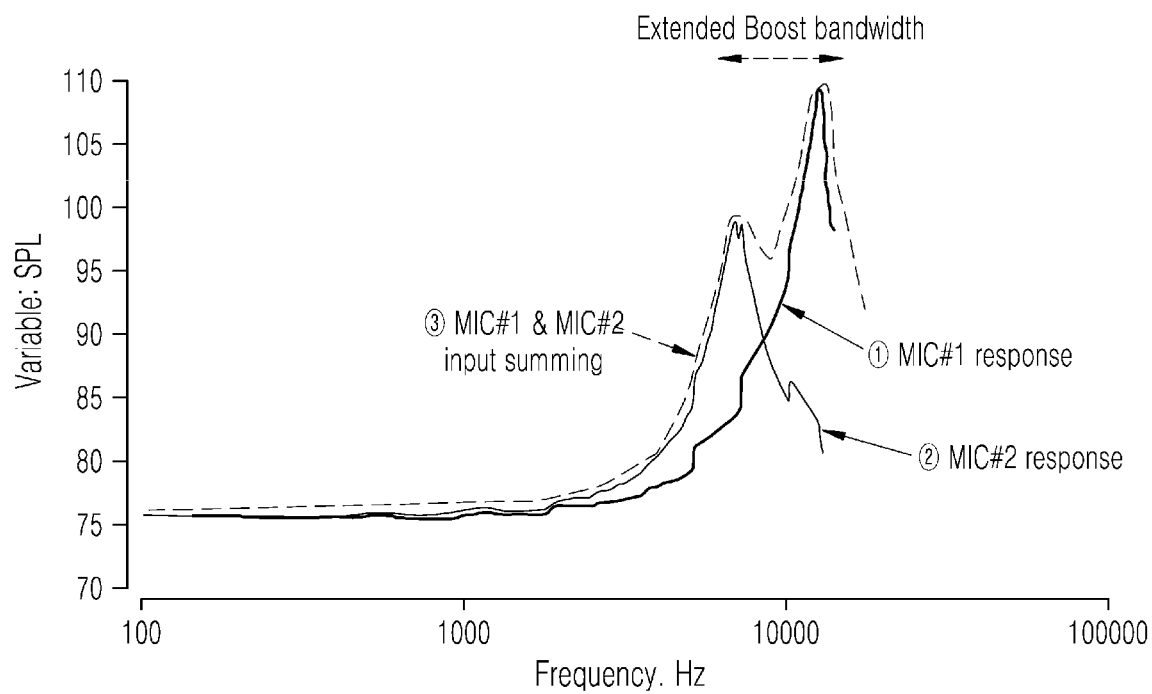

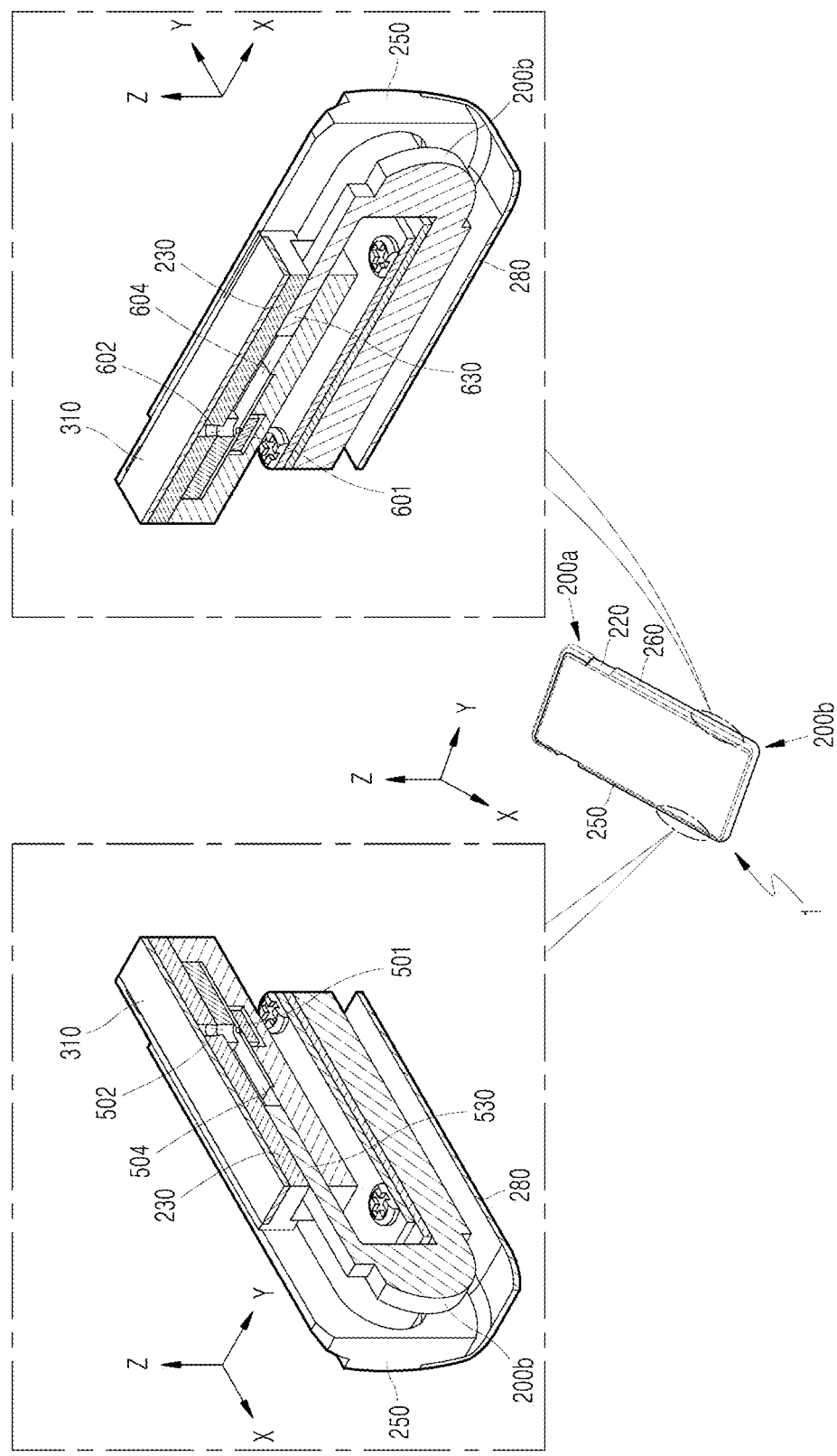
[FIG. 17a]

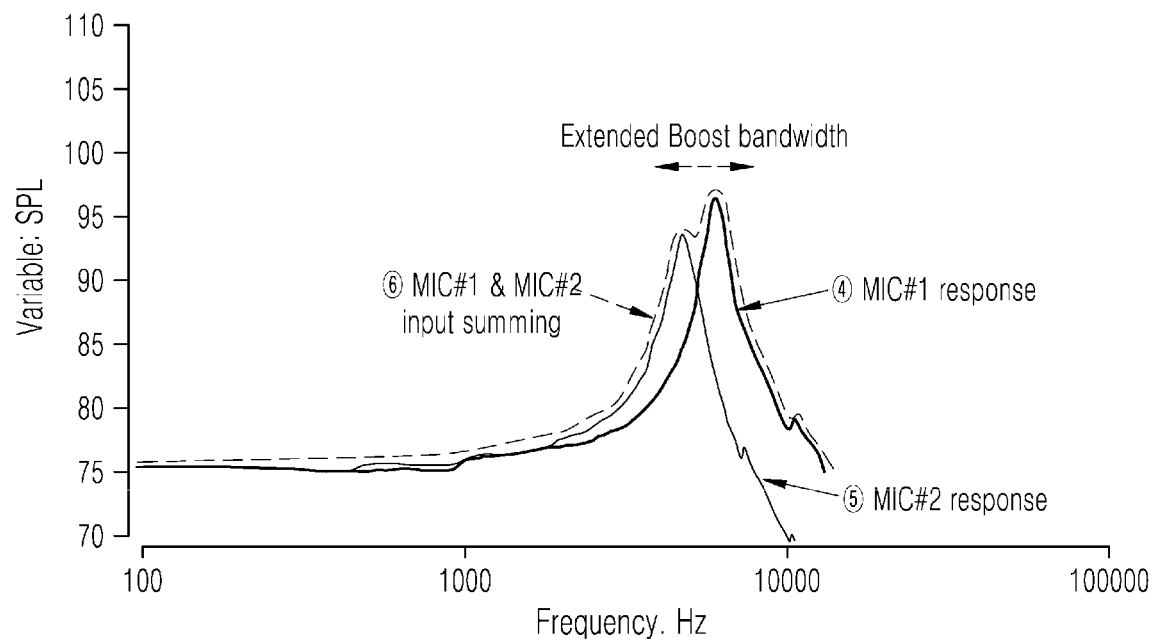
[FIG. 17b]

FLEXIBLE DISPLAY DEVICE

CROSS REFERENCE TO RELATED APPLICATIONS

This application is the National Phase of PCT/KR2020/014190 filed on Oct. 16, 2020, which is hereby expressly incorporated by reference into the present application.

TECHNICAL FIELD

The present disclosure relates to a device including a flexible display and a microphone and, more particularly, to a portable device characterized in that two bodies move with respect to each other.

BACKGROUND ART

Various devices using a flexible display that can be bent while displaying image information have been developed and introduced.

Such a flexible display has been applied to mobile terminals such as mobile phones, smart phones, etc., and users can carry such mobile terminals and use them in various places. Representative examples of mobile devices to which a flexible display is applied are as follows.

Firstly, research and development has been underway for foldable devices having a structure in which a flexible display is applied to two bodies that are connected to each other by a folding structure (e.g., by a hinge). In such foldable devices, since the flexible display may be disposed to completely cover the two bodies and the folding structure, a relatively large-sized display can be implemented in the devices.

As another example of devices using a flexible display, rollable devices having a structure in which a display is rolled up and unrolled have been studied and developed. In such rollable devices, as the flexible display is rolled, the total size or area of the entire display can be reduced. On the contrary, as the flexible display is unrolled, the total size or area of the entire display can be increased.

As still another example of devices using a flexible display, there are devices in which as two bodies slide with respect to each other, a flexible display having a U-shape due to a curved middle portion thereof is deformed such that the surface area of the flexible display seen from one side thereof changes.

The mobile terminals to which a flexible display is applied may be provided with a PCB, a battery, a camera, a speaker, a microphone, and the like.

Usually, a microphone is provided inside the mobile terminal, and an acoustic path, which is a passage extending from the microphone to the outside of the mobile terminal, is provided.

DISCLOSURE

Technical Problem

The present disclosure describes a flexible display device with a structure that can change the volume of an acoustic path of a microphone and change acoustic characteristics (resonance frequency characteristics) therefrom, in a device in which a flexible display is deformed while two bodies move relative to each other.

The present disclosure describes a flexible display device with a structure that can expand and deform a bandwidth of a resonance frequency according to an acoustic path of a microphone, in a device in which a flexible display is deformed while two bodies move relative to each other.

The present disclosure describes a flexible display device that can recognize a state of the flexible display device by changing a resonance frequency according to an acoustic path of a microphone and operate differently for each state, in a device in which a flexible display is deformed while two bodies move relative to each other.

Technical Solution

According to one aspect of the present disclosure, the flexible display device may be formed to be gripped and carried by a user. That is, the flexible display device may be formed to have approximately the same size, the same shape, and the same weight as general mobile terminals.

In some embodiments, the flexible display device may include a first body, a second body, and a flexible display.

The second body may be formed to move relative to the first body in a direction parallel to a first direction. The second body may be formed to move relative to the first body in a direction parallel to a first direction. The second body may move relative to the first body in the first direction. The second body may move relative to the first body in a direction opposite to the first direction.

The first body may be formed to move relative to the second body in a direction parallel to the first direction. The first body may move relative to the second body in the direction opposite to the first direction. The first body may move relative to the second body in the first direction.

The second body may reciprocate between a first position and a second position in the direction parallel to the first direction, relative to the first body. The first position may be a relative position of the second body with respect to the first body, and the second position may also be a relative position of the second body with respect to the first body.

When the second body is in the first position relative to the first body, it can be said that the flexible display device is in a first state, and when the second body is in the second position relative to the first body, it can be said that the flexible display device is in a second state. Accordingly, in the description of the present disclosure, "the first position" may be used in the same sense as "the first state of the flexible display device," and "the second position" may be used in the same sense as "the second state of the flexible display device."

The direction from the first position toward the second position is the first direction.

The flexible display device may include a first edge portion and a second edge portion forming opposite edge portions facing each other.

The first edge portion and the second edge portion may be parallel to each other or may be substantially parallel to each other.

In one embodiment, the first edge portion may be fixed to the first body, and the second edge portion may be fixed to the second body. In another embodiment, the first edge portion may be integrated with the first body, and the second edge portion may be integrated with the second body.

When the first edge portion forms an upper edge portion of the flexible display device, the second edge portion may form a lower edge portion of the flexible display device.

The direction from the first edge portion to the second edge portion may be the first direction.

The second body may include a support.

The support may be formed along a second direction, which is a direction orthogonal to the first direction.

The support may be formed in the shape of a roller that is rotatable about a rotational axis extending in the second direction. That is, the support may be rotatably coupled to the second body.

The flexible display may include a first region and a second region.

The first region may be a region of the flexible display that is coupled to the first body. The first region may be fixedly coupled to the first body.

The first region may be fixed in front of the first body to face forward. The first region may form a front surface of the flexible display device. The first region may be formed as a plane surface. The first region may be parallel to the first direction and the second direction.

The second region may be a region of the flexible display that extends from the first region. A portion of the second region may be curved. A portion of the second region may be curved into a semicircular shape, and as the second body moves, the position of the curved portion in the second region may be changed.

A surface area of the second region that forms a single plane surface with the first region may change as the second body moves.

When the second body moves in the first direction relative to the first body, the surface area of the second region that forms a single plane surface with the first region may increase. When the second body moves in the direction opposite to the first direction relative to the first body, the surface area of the second region that forms a single plane surface with the first region may decrease.

The second region may be curved around the support.

A portion of the second region may be curved about a curvature center line, which coincides with the rotational axis of the support, to form a curved surface.

The second region may include a first connected region and a second connected region.

The first connected region may be a region that extends from the first region.

The second connected region may be a region that extends from the first connected region.

When the second body is in the first position, the first connected region may be curved around the support to form a curved surface, and the second connected region may be parallel to the first region. When the second body is in the first position, the first connected region may be curved around the support to form a curved surface. When the second body is in the first position, the first connected region may form a curved surface of a semicircular shape about the curvature center line.

When the second body is in the second position, the first connected region may form a single plane surface with the first region, and a portion of the second connected region may be curved around the support, forming a curved surface. When the second body is in the second position, a portion of the second connected region may be curved around the support to form a curved surface. When the second body is in the second position, a portion of the second connected region may form a curved surface of a semicircular shape about the curvature center line.

According to one aspect of the subject described in the present disclosure, the flexible display device includes a first microphone, a first cavity, and a first variable cavity.

The first microphone is disposed inside the flexible display device.

The first cavity forms an acoustic path as a passage extending from the first microphone to the outside of the flexible display device.

The first variable cavity extends from the first cavity inside the flexible display device, and has a variable volume when the second body moves relative to the first body.

The first variable cavity may be configured such that the volume is changed along a direction parallel to the first direction.

The first microphone may be disposed in the first body.

In some implementations, the flexible display device includes a first gasket and a first adjustment bar.

The first gasket includes a first aperture forming a portion of the first cavity and a first inner adjustment groove extending from the first aperture and forming all or part of the first variable cavity. The first gasket is disposed outside the first microphone.

The first adjustment bar is formed along the first direction. The first adjustment bar is elongated along the first direction. One portion of the first adjustment bar may be inserted into the first inner adjustment groove, while the other portion thereof may be fixed to the second body.

In some embodiments, the flexible display device includes a first frame.

The first frame includes a first accommodation space that accommodates the first microphone, a first seating space that is provided outside the first accommodation space and accommodates the first gasket, and a first outer adjustment groove that extends from the first seating space and is aligned with the first inner adjustment groove. The first frame is fixed to the first body.

The first outer adjustment groove and the first inner adjustment groove form the first adjustment groove together.

A degree to which the first adjustment bar is inserted into the first adjustment groove may be changed.

The first variable cavity may be a remaining space in which the first adjustment bar is not inserted in a space formed by the first adjustment groove. With an increase in the degree of insertion of the first adjustment bar into the first adjustment groove, the volume of the first variable cavity decreases, and with a decrease in the degree of insertion of the first adjustment bar into the first adjustment groove, the volume of the first variable cavity increases.

In some embodiments, the flexible display device includes a support plate.

The support plate includes a second aperture that forms a portion of the first cavity and is aligned with the first aperture and a first horizontal groove that extends from the second aperture in a direction parallel to the first region and forms a portion of the first cavity.

The support plate is fixed to the first body and supports an inner surface of the first region.

A forming direction of the first horizontal groove may be parallel to a second direction perpendicular to the first direction.

In some embodiments, the flexible display device includes a second microphone, a second cavity, and a second variable cavity.

The second microphone is disposed inside the flexible display device.

The second microphone may be disposed in the first body.

The second cavity forms an acoustic path as a passage extending from the second microphone to the outside of the flexible display device.

The first cavity and the second cavity may be independently provided to be spaced apart from each other.

The second variable cavity extends from the second cavity inside the flexible display device, and has a variable volume when the second body moves relative to the first body.

The first variable cavity and the second variable cavity may be independently provided to be spaced apart from each other.

The second variable cavity may be configured such that the volume is changed along a direction parallel to the first direction.

The first variable cavity and the second variable cavity may have different volumes at the same time.

The first body may include a first side edge portion and a second side edge portion.

The first side edge portion and the second side edge portion are disposed on opposite sides facing the first region respect to a reference plane, respectively. The reference surface is a virtual surface crossing the first body and the second body in parallel with the first direction.

The first side edge portion and the second side edge portion are respectively formed along the first direction.

The first variable cavity may be disposed adjacent to the first side edge portion, and the second variable cavity may be disposed adjacent to the second side edge portion.

The flexible display device may include a second gasket and a second adjustment bar.

The second gasket includes a third aperture forming a portion of the second cavity and a second inner adjustment groove extending from the third aperture and forming part or all of the second variable cavity. The second gasket is disposed outside the second microphone.

The second adjustment bar is formed along the first direction. The second adjustment bar may be elongated along the first direction. One portion of the second adjustment bar may be inserted into the second inner adjustment groove, while the other portion thereof may be fixed to the second body.

In some embodiments, the flexible display device includes a second frame.

The second frame includes a second accommodation space that accommodates the second microphone, a second seating space that is provided outside the second accommodation space and accommodates the second gasket, and a second outer adjustment groove that extends from the second seating space and is aligned with the second inner adjustment groove. The second frame is fixed to the first body.

The second outer adjustment groove and the second inner adjustment groove form a second adjustment groove together.

The degree to which the second adjustment bar is inserted into the second adjustment groove is changed.

The second variable cavity may be a remaining space in which the second adjustment bar is not inserted in a space formed by the second adjustment groove. With an increase in the degree of insertion of the second adjustment bar into the second adjustment groove, the volume of the second variable cavity decreases, and with a decrease in the degree of insertion of the second adjustment bar into the second adjustment groove, the volume of the second variable cavity increases.

The support plate includes a fourth aperture forming a portion of the second cavity and communicating with the third aperture, and a second horizontal groove extending from the fourth aperture in a direction parallel to the first region and forming a portion of the second cavity.

The flexible display device includes a controller.

The controller may be configured to identify a position of the second body with respect to the first body based on a change in a resonance frequency in the first cavity according to a change in the volume of the first variable cavity.

The controller may be configured to control the flexible display device to operate a first mode when the second body is in the first position.

The controller may be configured to control the flexible display device to operate a second mode when the second body is in the second position.

The controller may be configured to control the flexible display device to operate a third mode when the second body is between the first position and the second position.

The controller may be configured to identify a position of the second body with respect to the first body based on a change in a resonance frequency in the first cavity according to a change in the volume of the first variable cavity and a change in a resonance frequency in the second cavity according to a change in the volume of the second variable cavity.

The resonance frequency in the first cavity may be different from the resonance frequency in the second cavity.

In the flexible display device, the sensitivity of the first microphone may be combined with the sensitivity of the second microphone.

In some embodiments, the flexible display device may include a plurality of support bars.

The support bar may be elongated in a direction parallel to the first region and parallel to a second direction perpendicular to the first direction, and may be fixed to an inner surface of the second region.

The support bar may include a first support slider, a second support slider, and a connection arm.

The first support slider forms one end of the support bar.

The second support slider forms an end of the support bar on an opposite side of the first support slider.

The connection arm connects the first support slider and the second support slider and supports the second region.

The second body may include a first movement guide groove and a second movement guide groove.

The first movement guide groove is formed as a U-shaped groove, and forms a path through which the first support slider is inserted and moved.

The second movement guide groove is formed as a U-shaped groove, and forms a path through which the second support slider is inserted and moved.

Advantageous Effects

In one embodiment, the first variable cavity extends from the first cavity. When the second body moves relative to the first body, the volume of the first variable cavity changes, and thus the resonance frequency in the first cavity changes. When the second body moves between the first position and the second position relative to the first body, the resonance frequency of the first cavity in the first position is different from the resonance frequency of the first cavity in the second position. A flexible display device having various sound characteristics may be provided in which acoustic characteristics in the first position, acoustic characteristics in the second position, and acoustic characteristics between the first position and the second position are different from each other.

In one embodiment, when the second body moves relative to the first body, the volume of the second variable cavity changes, and thus the resonance frequency in the second cavity changes. Since the first variable cavity and the second variable cavity may have different volumes at the same time, the resonance frequency in the first cavity may be different from the resonance frequency in the second cavity. Since sound may be received through the first microphone and the second microphone, the flexible display device may be provided which can expand and deform the bandwidth of the frequency by combining the resonance frequency in the first cavity and the resonance frequency in the second cavity.

In one embodiment, the flexible display device includes a controller configured to locate the second body relative to a first body based on a change in a resonance frequency in a first cavity. The controller may control the flexible display device to operate the first mode when the second body is in the first position, control the flexible display device to operate the second mode when the second body is in the second position, and control the flexible display device to operate the third mode when the second body is between the first position and the second position. In one embodiment of the present disclosure, the flexible display device may be provided which can identify the state of the flexible display device by a change in the resonance frequency of the sound path and operate differently for each state.

In one embodiment, an adjustment bar (i.e., a first adjustment bar and/or second adjustment bar) and an adjustment groove (i.e., first adjustment groove and/or second adjustment groove) are formed along the first direction. When the first adjustment bar, the second adjustment bar, the first adjustment groove, and the second adjustment groove are provided together, the first adjustment bar and the first adjustment groove in one group and the first adjustment bar and the second adjustment groove in the other group are formed on opposite sides with respect to a reference plane. The adjustment bar (i.e., the first adjustment bar and/or second adjustment bar) may move along a relative movement direction of the first body and the second body, the volume of the variable cavity (i.e., the first variable cavity and/or second variable cavity) may be deformed, the flexible display device may be smoothly deformed, and an increase in manufacturing costs due to volume deformation of the variable cavity (i.e., the first variable cavity and/or second variable cavity) can be minimized.

BRIEF DESCRIPTION OF DRAWINGS

FIG. 1 is a block diagram for describing a flexible display device.

FIG. 2a is a front view illustrating a first state of the flexible display device and FIG. 2b is a view illustrating the flexible display device of FIG. 2a in a second state in which the flexible display device has been deformed.

FIG. 3a is a bottom view illustrating the flexible display device of FIG. 2a and FIG. 3b is a bottom view illustrating the flexible display device illustrated in FIG. 2b.

FIG. 4 is an exploded perspective view illustrating the flexible display device of FIG. 2a.

FIG. 5a is a perspective view illustrating a flexible display separated from the flexible display device of the first state and FIG. 5b is a perspective view illustrating a view (a view in the second state) in which the flexible display of FIG. 5a is deformed.

FIG. 6a is a cross-sectional view of FIG. 2a taken along line A-A'. FIG. 6b is a cross-sectional view illustrating a view in which the flexible display device of FIG. 6a is deformed.

FIG. 7a is a cross-sectional view illustrating the separated flexible display device of FIG. 6a and FIG. 7b is a bottom view illustrating the separated flexible display device of FIG. 6b.

FIG. 8a is a cross-sectional view illustrating inner surface sides of a third side edge portion and a second edge portion and FIG. 8b is a cross-sectional view illustrating inner surface sides of a fourth side edge portion and the second edge portion.

FIG. 9 is a cross-sectional view schematically illustrating a view in which a support bar, an inner plate, and a flexible display are coupled.

FIG. 10a is a perspective view illustrating a portion of the configuration of the flexible display device in region P1 of FIG. 2a cut along a first direction and a second direction. In FIG. 10a, some components are illustrated separately.

FIG. 10b is a view illustrating an assembled state of the components of FIG. 10a, and is a cross-sectional perspective view taken along line B-B' of FIG. 10a.

FIG. 11a is a perspective view of the flexible display device in a first state and is a cross-sectional perspective view illustrating an enlarged portion thereof.

FIG. 11b is a perspective view of the flexible display device in a second state and is a cross-sectional perspective view illustrating an enlarged portion thereof.

FIG. 12a is a cross-sectional perspective view illustrating a portion of the configuration of the flexible display device in the first state and is a cross-sectional perspective view illustrating the configuration of FIG. 10b when viewed in another direction.

FIG. 12b is a graph illustrating sound characteristics for each frequency in the first cavity of FIG. 12a.

FIG. 13A is a cross-sectional perspective view illustrating a partial configuration of the flexible display device between the first state and the second state and is a cross-sectional perspective view illustrating a state in which a portion of the configuration illustrated in 12a moves.

FIG. 13b is a graph illustrating sound characteristics for each frequency in the first cavity of FIG. 13a.

FIG. 14a is a cross-sectional perspective view illustrating a partial configuration of the flexible display device in the second state and is a cross-sectional perspective view illustrating a state in which a portion of the configuration of FIG. 13a moves.

FIG. 14b is a graph illustrating sound characteristics for each frequency in the first cavity of FIG. 14a.

FIG. 15a is a perspective view illustrating a portion of the configuration of the flexible display device in region P2 of FIG. 2a cut along a first direction and a second direction. In FIG. 15a, some components are illustrated separately.

FIG. 15b is a view illustrating an assembled state of the components of FIG. 15a, and is a cross-sectional perspective view taken along line C-C' of FIG. 15a.

FIG. 16a is a perspective view of the flexible display device in the first state and is a cross-sectional perspective view illustrating an enlarged portion thereof.

FIG. 16b is a graph illustrating the sound characteristics for each frequency in the first cavity and the sound characteristics for each frequency in the second cavity in FIG. 16a.

FIG. 17a is a perspective view of the flexible display device in a state in which the second body moves in the first direction in FIG. 16a and is a cross-sectional perspective view illustrating an enlarged portion thereof.

FIG. 17b is a graph showing the sound characteristics for each frequency in the first cavity and the sound characteristics for each frequency in the second cavity in FIG. 17a.

DETAILED DESCRIPTION

Hereinafter, exemplary embodiments disclosed herein will be described in detail with reference to the accompanying drawings, and like reference numerals designate like elements, and redundant description thereof will be omitted. Suffixes "module" and "unit or portion" for elements used in the following description are merely provided for facilitation of preparing this specification, and thus they are not granted a specific meaning or function. Wherever possible, the same reference numbers will be used throughout the drawings to refer to the same or like parts. In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, and the like, may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The singular expressions include plural expressions unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A flexible display device (also referred to as a 'display device') described in the present specification may include a mobile terminal such as a portable phone, a smartphone, a laptop computer, a digital broadcast terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be integrated with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcast-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the another mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor that senses the presence of an object that is approaching a predetermined sensing surface or the presence of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source and transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch. Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

The flexible display device 1 according to the embodiment of the present disclosure may include a flexible display 300 which is configured to be deformed by an external force.

The deformation may be at least one of warping, bending, folding, twisting, rolling, or spreading of a display module. Such a deformable display module may be referred to as a "flexible display." Here, the flexible display 300 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 300 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 300 may be in a bent state, not in a flat state. Here, when an external force is applied to the flexible display 300, a portion of the flexible display 300 may be deformed into a flat state, a less bent state, or a more bent state.

Meanwhile, the flexible display 300 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 300 is in the flat state or in the bent state.

A flexible display device 1 according to the example in which the flexible display 300 is deformable may include a deformation sensor capable of sensing deformation in the flexible display 300. The deformation sensor may be included in the sensor 140 (see FIG. 1).

The deformation sensor may be provided in the flexible display 300 or in a body 200, and may sense information related to deformation of the flexible display 300. Here, the information related to the deformation may include information on a direction in which the flexible display 300 is deformed, information on a degree of the deformation of the flexible display 300, information on a position of the deformation in the flexible display 300, information on a time of the deformation, and information on an acceleration at which the deformed flexible display 300 is recovered. In addition to the above information, various other types of information that can be sensed as the flexible display 300 is bent may also be included.

Further, the controller 180 (see FIG. 1) may change information displayed on the flexible display 300 or generate a control signal for controlling a function of the flexible display device 1, on the basis of the information related to the deformation of the flexible display 300 sensed by the deformation sensor.

The deformation of the flexible display 300 may not be limited to the deformation caused by an external force. For example, when the flexible display 300 is in a state in which a portion thereof is spread, the portion may be deformed to be bent by a command of the user or an application.

FIG. 2a is a front view of the flexible display device 1 in a first state, and FIG. 2b is a view illustrating the flexible display device 1 of FIG. 2a in a second state in which the flexible display device 1 has been deformed.

FIG. 3a is a rear view of the flexible display device 1 of FIG. 2a, and FIG. 3b is a rear view of the flexible display device 1 of FIG. 2b.

FIG. 4 is an exploded perspective view of the flexible display device 1 of FIG. 2a.

The flexible display device 1 may include a body 200, a plurality of support bars 370, and a support 400. The body 200 may include a first body 200a and a second body 200b.

In describing embodiments of the present disclosure, a first direction (X direction), a second direction (Y direction), and a third direction (Z direction) shown in the drawings are directions perpendicular to one another.

The flexible display device 1 may include two surfaces 1a and 1b which are opposite to each other. In other words, the flexible display device 1 may include a first surface 1a and a second surface 1b. A direction the first surface 1a faces (i.e. a direction perpendicular to or substantially perpendicular to the first surface 1a) may be opposite to a direction the second surface 1b faces (i.e. a direction perpendicular to or substantially perpendicular to the second surface 1b). In the flexible display device 1, the first surface 1a may face the third direction (Z direction), and the second surface 1b may face a direction opposite to the third direction (Z direction). When the first surface 1a is a front surface of the flexible display device 1, the second surface 1b may be a rear surface of the flexible display device 1.

Hereinafter, unless otherwise specified, the third direction (Z direction) refers to the forward direction of the flexible display device 1, and the direction opposite to the third direction (Z direction) refers to the rearward direction of the flexible display device 1.

The body 200 may form the overall shape of the flexible display device 1. The body 200 may form the frame of the flexible display device 1. The body 200 may be made of a relatively hard material. For example, the body 200 may be made of plastic, carbon, metal, or a combination thereof. Other components of the flexible display device 1 may be coupled to the body 200.

The body 200 may be formed in various shapes so as to support other components coupled thereto.

The body 200 may have a flat shape as a whole, or may have a curved shape such as a curved surface. An interior of the body 200 may be fully filled or may not be fully filled.

For example, when viewed from the front (third direction), the body 200 may have a quadrangular shape as a whole, and may be flat as a whole.

The body 200 may be divided into two or more parts. As described in detail above, the body 200 may include the first body 200a and the second body 200b, and the first body 200a and the second body 200b may be formed to move relative to each other (see FIGS. 2a, 2b, 3a, and 3b).

The second body 200b may slide and reciprocate relative to the first body 200a. Accordingly, when viewed from the front, the total area occupied by the body 200 may change as the second body 200b moves.

The second body 200b may reciprocate relative to the first body 200a between a first position and a second position.

When viewed from the front or rear, the total area occupied by the body 200 (the area of the body 200 projected in the Z direction) may be the smallest when the second body 200b is in the first position (see FIGS. 2a and 3a), and the total area occupied by the body 200 (the area of the body 200 projected in the Z direction) may be the largest when the second body 200b is in the second position (see FIGS. 2b and 3b).

When viewed from the front or rear, the overlapping area between the first body 200a and the second body 200b may be the largest when the second body 200b is in the first position (see FIGS. 2a and 3a), and the overlapping area between the first body 200a and the second body 200b may be the smallest when the second body 200b is in the second position (see FIGS. 2b and 3b).

A movement direction of the second body 200b relative to the first body 200a may be parallel to the first direction (X direction).

The first body 200a may have a predetermined length in the first direction (X direction), and may also have a predetermined length in the second direction (Y direction) orthogonal to the first direction. The first body 200a may have a predetermined length in the third direction (Z direction) orthogonal to the first and second directions, but the length of first body 200a in the third direction may be sufficiently small compared to the lengths thereof in the first and second directions. Accordingly, the first body 200a may be formed to be flat or substantially flat along the first and second directions.

The first body 200a may have a plate shape.

The second body 200b may have a predetermined length in the first and second directions. The second body 200b may have a predetermined length in the third direction, but the length of the second body 200b in the third direction may be sufficiently small compared to the lengths thereof in the first and second directions. Accordingly, the second body 200b may be formed to be flat or substantially flat in the first and second directions.

The second body 200b may have a plate shape.

The first body 200a and the second body 200b may be formed in the shape of plates parallel to each other.

FIG. 5a is a perspective view of a flexible display separated from the flexible display device in the first state, and FIG. 5b is a perspective view of the flexible display of FIG. 5a when the flexible display has been deformed (i.e. when the flexible display device is in the second state).

FIG. 6a is a cross-sectional view of the flexible display device of FIG. 2a taken along the line A to A'. FIG. 6b is a cross-sectional view of the flexible display device of FIG. 6a when the flexible display device has been deformed.

FIG. 7a is a cross-sectional view of the flexible display separated from the flexible display device of FIG. 6a, and FIG. 7b is a cross-sectional view of the flexible display separated from the flexible display device of FIG. 6b.

The support 400 may be fixed to the second body 200b. The support 400 may be fixedly coupled to the second body 200b, or may be fixed to the second body 200b such that the support 400 rotates about a rotational axis 401.

The support 400 may be formed along the second direction (Y). The support 400 may be formed to extend in the second direction (Y direction), and may have a constant cross section along the second direction.

In the flexible display device 1, the support 400 may be formed to support a portion of an inner surface of the flexible display 300. That is, a portion of the flexible display 300 may be curved around the support 400, and a direction of formation of the flexible display 300 may be changed along the circumferential direction of the support 400.

The support 400 may be formed to rotate in both directions about a central axis 401 which is parallel to the second direction. That is, the support 400 may be coupled to the second body 200b so as to rotate about the central axis 401.

The support 400 may be formed in the shape of a roller.

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

The flexible display 300 may include a first region 310, a second region 320, and a third region 330, which are sequentially connected. The flexible display 300 may include a fourth region 340.

If the flexible display 300 is not coupled to the body 200 and is spread flat, the fourth region 340, the first region 310, the second region 320, and the third region 330 may form a single plane.

Broken lines shown in FIG. 2b are imaginary lines respectively representing a boundary between the first region 310 and (a first connected region 321 of) the second region 320, and a boundary between the first connected region 321 and a second connected region 322.

The first region 310 may have a predetermined area and may be coupled to the body 200 from any one side of the body 200. The first region 310 may be coupled to the first body 200a, and may be fixed to the first body 200a. That is, the first region 310 may be formed so as not to move relative to the first body 200a.

The first region 310 may be parallel to the first and second directions. The first region 310 may be fixed in front of the first body 200a. The first region 310 may be fixed in front of the first body 200a based on the third direction. The first region 310 and the first body 200a may be coupled to each other so as to be parallel to each other.

In one embodiment of the present disclosure, the first region 310 may form a curved surface as a whole. Here, a curvature of the first region 310 may be smaller than a curvature of the first connected region 321, which will be described below, and a radius of curvature of the first region 310 may be greater than a radius of curvature of the first connected region 321. The radius of curvature of the first region 310 may be sufficiently greater than the radius of curvature of the first connected region 321. For example, when the radius of curvature of the first connected region 321 is "a," the radius of curvature of the first region 310 may be "10*a" or greater.

In another embodiment of the present disclosure, the first region 310 may form a plane surface as a whole. The first region 310 may form a planar outer surface of the flexible display 300 and may be disposed on a front surface of the body 200. The first region 310 may have a constant cross section in the first and second directions.

Hereinafter, description will be made on the assumption that the first region 310 of the flexible display device 1 is a plane surface.

A direction the first region 310 faces (i.e. a direction an outer surface of the first region 310 faces) may be the third direction. The first region 310 may form a part or the entirety of the first surface 1a of the flexible display device 1.

The fourth region 340 may extend from the first region 310 and form an end portion of the flexible display 300. The fourth region 340 may have a constant cross section along the second direction, and may form a curved surface. In one embodiment, the fourth region 340 may form a dummy portion on which an image is not displayed, and in another embodiment, the fourth region 340 may be configured to display an image thereon.

The second region 320 may extend from the first region 310, and a portion of the second region 320 may be curved around support 400. That is, a direction of formation of the second region 320 may be changed as the second region 320 passes around the support 400.

The second region 320 may have a constant cross section along the second direction.

A portion of the second region 320 may be curved into a semicircular shape, and a curved position of the second region 320 may change according to movement of the second body 200b. When the second body 200b is in the first position, the first connected region 321 may be curved into a semicircular shape, and when the second body 200b is in the second position, a portion of the second connected region 322 may be curved into a semicircular shape.

The second region 320 may include the first connected region 321 and the second connected region 322.

The first connected region 321 may be directly connected to the first region 310, and the second connected region 322 may be directly connected to the first connected region 321 and the third region 330.

When the second body 200b is in the first position, the first connected region 321 may form a curved surface along the circumferential direction of the support 400.

When the second body 200b is in the first position, the first connected region 321 may form an outer surface of the flexible display 300 that is curved about a curvature center line CL1. When the second body 200b is in the first position, the curvature center line CL1 may be an imaginary straight line that forms a center of curvature of the first connected region 321, and may be parallel to the second direction.

When the second body 200b is in the first position, a cross section of the first connected region 321 may form a semicircular shape.

The curvature center line CL1 may coincide with the central axis 401 of support 400.

When the second body 200b is in the second position, the curvature center line CL1 may be a center of curvature of the second connected region 322 forming a curved surface.

An image may be displayed on the first connected region 321 and the first region 310.

A surface area of the first region 310 may be greater than a surface area of the first connected region 321.

When the second body 200b is in the first position, the second connected region 322 may form an outer surface of the flexible display 300 that is an opposite surface to the first region 310. That is, when the second body 200b is in the first position, and the first region 310 faces the third direction (Z direction), the second connected region 322 may face a direction opposite to the third direction (Z direction). An image may be displayed on the second connected region 322.

The second connected region 322 may have a constant cross section along the second direction. When the second body 200b is in the first position, the second connected region 322 may have a constant cross section along the first direction.

The flexible display 300 may be formed in such a manner that the first region 310, the first connected region 321, and the second connected region 322 are sequentially connected, and when the second body 200b is in the first position, the first region 310, the first connected region 321, and the second connected region 322 may form a U-shape as a whole.

In one embodiment of the present disclosure, when the second body 200b is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. The radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200b is in the first position, the second connected region 322 may form a plane surface as a whole. In addition, the second connected region 322 may be parallel to the first region 310. Hereinafter, description will be made on the assumption that when the second body 200b is in the first position, the second connected region 322 forms a plane surface and is parallel to the first region 310.

The third region 330, on the opposite side to the first region 310, may extend from the second region 320. The third region 330 may be formed to extend from the second connected region 322 and may form an end portion of the flexible display 300.

In the flexible display 300, the first region 310, the second region 320, and the fourth region 340 may be configured to display an image thereon, and the third region 330 may be configured not to display an image thereon. In the flexible display 300, the third region 330 may be an extended portion of a display substrate, and may form a dummy portion on which an image is not displayed.

The third region 330 may be formed separately from the flexible display 300 and then be coupled to the flexible display 300. Or, the third region 330 may be integrated with the flexible display 300 in the manufacturing process of the flexible display 300. The third region 330 may be formed as a substrate of the flexible display 300.

The third region 330 may be formed in the form of a plastic film, and may be flexibly curved.

The camera 121 may be fixed to a front surface of the body 200. The camera 121 may be fixed to a front surface of the first body 200a.

The camera 121 may be fixed to a rear surface of the body 200. The camera 121 may be coupled to the body 200 so as to face the direction opposite to the third direction (Z direction).

The camera 121 may be fixed to a rear surface of the first body 200a.

The camera 121 may be fixed to the body 200 at a portion away from the support 400. That is, if the support 400 is coupled to the body 200 at a lower portion of the flexible display device 1, the camera 121 may be coupled to the body 200 at an upper portion of the flexible display device 1. The camera 121 may be fixed to an edge of the first body 200a that is farthest from the support 400.

The camera 121 may be two or more cameras 121 arranged in the second direction.

The first body 200a may include a support plate 230.

The support plate 230 may be formed in a flat plate shape, and may be formed in a size the same as or similar to a size of the first region 310. The support plate 230 may be coupled in a form in which the first region 310 is laminated on an outside (front side) of the support plate 230, and the support plate 230 may support the first region 310 from inside the first region 310.

The first body 200a may include a first edge portion 205.

The first edge portion 205 may form any one edge of the flexible display device 1. The first edge portion 205 may form any one side of the flexible display device 1 having a rectangular shape.

The first edge portion 205 may form an upper side edge of the first body 200a.

The first edge portion 205 may be fixed to the first body 200a. The first edge portion 205 may be integrally formed with the first body 200a, or may be formed separately from the first body 200a and then fixed thereto.

The first edge portion 205 may generally be formed to extend in the second direction (Y direction).

At least a portion of the first edge portion 205 may have a constant cross section in the second direction (Y direction). An outer surface of the first edge portion 205 may form a convex curved surface, and a cross section of the first edge portion 205 may have, for example, a semicircular shape.

The fourth region 340 may be fixed to the first edge portion 205.

The first body 200a may include a first side edge portion 210 and a second side edge portion 220. The first side edge portion 210 and the second side edge portion 220 may form edges on both sides of the first body 200a, and may extend in the first direction. The first side edge portion 210 may be formed over the entire section of any one edge of the first body 200a, or may be formed over a partial section thereof. The second side edge portion 220 may be formed over the entire section of any one edge of the first body 200a, or may be formed over a partial section thereof.

The first side edge portion 210 and the second side edge portion 220 may be formed to be parallel to the first direction, and may have constant cross sections in the first direction. If the first side edge portion 210 forms a left side edge of the first body 200a, the second side edge portion 220 may form a right side edge of the first body 200a.

The second body 200b may include a second edge portion 206.

The second edge portion 206 may form an edge of the flexible display device 1 on the opposite side of the flexible display device 1 to the first edge portion 205. If the first edge portion 205 forms an upper side edge of the flexible display device 1, the second edge portion 206 may form a lower side edge of the flexible display device 1.

The second edge portion 206 may be disposed at an outer side of the support 400.

Between the second edge portion 206 and the support 400, a gap 207, which is relatively narrow, may be provided, and through the gap 207, the flexible display 300 may move, forming a curved surface (see FIGS. 6a and 6b).

In addition, a connection arm 373 of the support bar 370 may move through the gap 207.

The second edge portion 206 may be fixed to the second body 200b. The second edge portion 206 may be integrally formed with the second body 200b, or may be formed separately from the second body 200b and then fixed thereto.

The second edge portion 206 may generally be formed to extend in the second direction (Y direction).

At least a portion of the second edge portion 206 may have a constant cross section along the second direction (Y direction). An outer surface of the second edge portion 206 may form a convex curved surface, and a cross section of the second edge portion 206 may have a semicircular shape.

The second body 200b may include a third side edge portion 250 and a fourth side edge portion 260. The third side edge portion 250 and the fourth side edge portion 260 may form edges on both sides of the second body 200b, and may be formed to extend in the first direction. The third side edge portion 250 and the fourth side edge portion 260 may be formed to be parallel to the first direction, and may have constant cross sections along the first direction.

If the third side edge portion 250 forms a left side edge of the second body 200b, the fourth side edge portion 260 may form a right side edge of the second body 200b.

The third side edge portion 250 may be disposed to align with the first side edge portion 210, and may be disposed so as to come into close contact with the first side edge portion 210 or to be close thereto.

The third side edge portion 250 may be disposed at an outer side of the first side edge portion 210 or at an inner side of the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed at an outer side of the second side edge portion 220 or at an inner side of the second side edge portion 220.

The flexible display device 1 may include a first back cover 270 and a second back cover 280.

The first back cover 270 may be formed in the shape of a plate that is substantially parallel to the first direction (X direction) and the second direction (Y direction). The first back cover 270 may be parallel to or substantially parallel to the first region 310.

The first back cover 270 may form a back surface of the first body 200a. The first back cover 270 may be fixed to the first body 200a or may be detachably coupled to the first body 200a.

The first back cover 270 may be formed to be transparent or opaque.

The first back cover 270 may be formed such that a surface area thereof corresponds to a surface area of the first region 310, or is equal to or greater than the surface area of the first region 310.

The second back cover 280 may be formed in a shape of a plate that is substantially parallel to the first direction (X direction) and the second direction (Y direction). The second back cover 280 may be parallel to or substantially parallel to the first region 310.

The second back cover 280 may form a rear surface of the second body 200b. The second back cover 280 may be fixed to the second body 200b or may be detachably coupled to the second body 200b.

The second back cover 280 may be formed to be transparent or opaque.

When the second body 200b is in the first position, a surface area of the second back cover 280 may correspond to a surface area of the second connected region 322, or may be equal to or greater than the surface area of the second connected region 322.

When the back cover 280 is formed to be transparent, an image displayed on the second connected region 322 while the second body 200b is in the first position may be seen through the second back cover 280.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm.

According to one embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a sliding plate 360.

The sliding plate 360 may generally be formed in a shape of a flat plate extending along the second direction. The sliding plate 360 may be made of metal, plastic, and the like.

The sliding plate 360 may be fixed to an end portion of the flexible display 300. The sliding plate 360 may be fixed to the third region 330.

The sliding plate 360 may be coupled to the second body 200b such that the sliding plate 360 moves relative to the second body 200b along the first direction.

The sliding plate 360 may be slidably coupled to the second body 200b, and for this, both end portions of the sliding plate 360 may respectively be inserted into a first rear guide groove 252 and a second rear guide groove 262 and move therein.

FIG. 8a is a cross-sectional view illustrating inner surfaces of the third side edge portion 250 and the second edge portion 206, and FIG. 8b is a cross-sectional view illustrating inner surfaces of the fourth side edge portion 260 and the second edge portion 206.

FIG. 9 is a cross-sectional view schematically illustrating a state in which the support bar 370, the inner plate 350, and the flexible display 300 are coupled.

The second body 200b may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the third side edge portion 250, and the second rear guide groove 262 and the second front guide groove 263 may be formed in the fourth side edge portion 260.

In one embodiment of the present disclosure, the first connection guide groove 254 may be formed in the third side edge portion 250, and the second connection guide groove 264 may be formed in the fourth side edge portion 260. In another embodiment of the present disclosure, the first connection guide groove 254 and the second connection guide groove 264 may be formed in the second edge portion 206.

The first rear guide groove 252 may form a space inside the third side edge portion 250, may have a constant cross section along the first direction, and may be formed to be open inwards from a rear side of the third side edge portion 250.

The first front guide groove 253 may form a space inside the third side edge portion 250, may have a constant cross section along the first direction, and may be formed to be open inwards from a front side of the third side edge portion 250. The first front guide groove 253 may be symmetric with respect to the first rear guide groove 252.

The first connection guide groove 254 may form a semicircular-shaped space inside the second edge portion 206 of the second body 200b and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail, which will be described below.

The second rear guide groove 262 may form a space inside the fourth side edge portion 260, may have a constant cross section along the first direction, and may be formed to be open inwards from a rear side the fourth side edge portion 260.

The second front guide groove 263 may form a space inside the fourth side edge portion 260, may have a constant cross section along the first direction, and may be formed to be open inwards from a front side of the fourth side edge portion 260. The second front guide groove 263 may be symmetric with respect to the second rear guide groove 262.

The second connection guide groove 264 may form a semicircular-shaped space inside the second edge portion 206 of the second body 200b and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail, which will be described below.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the plurality of support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the plurality of support bars 370 in the opposite side to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the plurality of support bars 370, are maintained stable like the first region 310.

A front surface of the connection arm 373 and a front surface of the support plate 230 may form a single plane.

The second region 320 may be maintained in a stable state by means of the plurality of support bars 370. In particular, when the second region 320 is formed as a touch screen to receive a touch input, the second region 320 may be stably supported by the plurality of support bars 370.

FIG. 10a is a perspective view illustrating a partial configuration of the flexible display device 1 in FIG. 2a cut along the first direction (X direction) and the second direction (Y direction). One portion of a cut surface illustrated in FIG. 10a is perpendicular to the first direction (X direction), and the other part is perpendicular to the second direction (Y direction). In FIG. 10a, some components are illustrated separately. In FIG. 10a, a portion 250a of the third side edge portion 250 is excluded.

FIG. 10b is a view illustrating an assembled state of the components of FIG. 10a and is a cross-sectional perspective view taken along line B-B' of FIG. 10a.

FIG. 11a is a perspective view illustrating a perspective view of the flexible display device 1 in the first state and is a cross-sectional perspective view illustrating an enlarged portion thereof.

FIG. 11b is a perspective view illustrating a perspective view of the flexible display device 1 in the second state and is a cross-sectional perspective view illustrating an enlarged portion thereof.

The flexible display device 1 according to one embodiment of the present disclosure includes the microphone, as described above. In one embodiment, the flexible display device 1 may include one microphone, and in another embodiment, the flexible display device 1 may include two or more microphones.

The flexible display device 1 may include a first microphone 501, a second microphone 601, or a first microphone 501 and a second microphone 601. Each of the first microphone 501 and the second microphone 601 may be formed as in the above-mentioned microphone 122.

First, a case in which the flexible display device 1 includes one first microphone 501 will be described.

The flexible display device 1 includes a first cavity 502 and a first variable cavity 504.

The first microphone 501 is disposed inside the flexible display device 1.

The first cavity 502 is a space inside the flexible display device 1 and forms an acoustic path as a passage extending from the first microphone 501 to the outside of the flexible display device 1. The external sound of the flexible display device 1 may be transmitted to the first microphone 501 through the first cavity 502.

The first variable cavity 504 is a space inside the flexible display device 1.

In one embodiment of the present disclosure, a space formed by the first variable cavity 504 is changed. That is, the volume of the first variable cavity 504 is changed.

The first variable cavity 504 is a space extending from the first cavity 502. That is, the first cavity 502 and the first variable cavity 504 communicate with each other and form an inner space of the flexible display device 1 together.

When the second body 200b moves relative to the first body 200a, the volume of the first variable cavity 504 is changed. In one embodiment, the volume of the first variable cavity 504 may be minimized when the second body 200b is in the first position, and the volume of the first variable cavity 504 may be maximized when the second body 200b is in the second position.

In one embodiment, the first variable cavity 504 may be configured to change a volume thereof in a direction parallel to the first direction (X direction).

In one embodiment, the first microphone 501 may be disposed in the first body 200a. Here, when the first body 200a and the second body 200b move relative to each other, the first microphone 501 does not move relative to the first body 200a, but moves relative to the second body 200b.

In another embodiment, the first microphone 501 may be disposed in the second body 200b. Here, when the first body 200a and the second body 200b move relative to each other, the first microphone 501 does not move relative to the second body 200b, but moves relative to the first body 200a.

Hereinafter, a case in which the first microphone 501 is disposed in the first body 200a will be described.

When the first microphone 501 is disposed in the first body 200a, the first microphone 501 may be fixed to the first body 200a. The first microphone 501 may be directly fixed to the first body 200a or may be fixed to the first body 200a via another means.

The flexible display device 1 includes a first gasket 520 and a first adjustment bar 530. In addition, the flexible display device 1 includes a first frame 510.

The first frame 510 may include a first accommodation space 511, a first seating space 512, and a first outer adjustment groove 513. Each of the first accommodation space 511, the first seating space 512 and the first outer adjustment groove 513 is a space formed in the first frame 510.

The first frame 510 may be integrated with the first body 200a. The first frame 510 may be separated from the first body 200a and then fixed to the first body 200a.

When the flexible display device 1 is in the first state, the first frame 510 may be disposed closer to the second edge portion 206 than the first edge portion 205. In the first state (or the first position), when the first edge portion 205 forms an upper part of the flexible display device 1 and the second edge portion 206 forms a lower part of the flexible display device 1, the first frame 510 may be formed in a lower part of the flexible display device 1.

The first frame 510 may be fixed to the first body 200a in front of the first direction (X direction) or may be integrated with the first body 200a. The first frame 510 may be fixed to the first body 200a at a foremost side of the first direction (X direction) or may be integrated with the first body 200a.

The first accommodation space 511 is an inner space of the first frame 510 and is configured to accommodate the first microphone 501.

The first seating space 512 is provided outside the first accommodation space 511. The first seating space 512 may have a concave groove shape recessed in the outer surface of the first frame 510. The first gasket 520 is accommodated in the first seating space 512. In the third direction (Z direction), the first seating space 512 may be formed ahead of the first accommodation space 511.

In the flexible display device 1, a PCB (printed circuit board) may be provided for mounting the first microphone 501. The first microphone 501 is mounted on the inner surface of the first PCB 505. The PCB 505 may be provided between the first accommodation space 511 and the first seating space 512. The first PCB 505 is first seated in the first seating space (512) in a form of shielding the first accommodation space 511, and the first gasket 520 is disposed on the outer surface of the first PCB 505.

A small aperture 505a is formed in the first PCB 505, which forms a portion of the first cavity 502. That is, the external sound of the flexible display device 1 is transmitted to the first microphone 501 through a hole 505a of the first PCB 505.

The first outer adjustment groove 513 may have a concave groove shape on the outer surface of the first frame 510. The first outer adjustment groove 513 extends from the first seating space 512 in the first direction (X direction).

A cross-section of the first outer adjustment groove 513 may be constantly formed along the first direction (X direction). The cross section of the first outer adjustment groove 513 may have a rectangular shape.

The width of the first outer adjustment groove 513 is smaller than that of the first seating space 512.

The width and cross-sectional size of the first outer adjustment groove 513 may be variously formed in consideration of the acoustic characteristics of the first microphone 501.

A length of the first outer adjustment groove 513 may be smaller than a movement range (a stroke, and a length between the first position and the second position) of the second body 200b relative the first body 200a. The length of the first outer adjustment groove 513 may be equal to or similar to ½ of the movement range (stroke) of the second body 200b relative to the first body 200a.

The first outer adjustment groove 513 extends from the first seating space 512 to an end of the first frame 510 along the first direction (X direction).

The first gasket 520 is seated in the first seating space 512. The first gasket 520 is inserted to fit the first seating space 512. An outer edge of the first gasket 520 inserted into the first seating space 512 is in close contact with the first frame 510, and the first gasket 520 seals the first microphone 501.

The first gasket 520 includes a first aperture 521 and a first inner adjustment groove 523.

The first aperture 521 is a hole penetrating the first gasket 520. The first aperture 521 penetrates the first gasket 520 in the third direction (Z direction). The first aperture 521 may be formed in a substantially center of the first gasket 520. The first aperture 521 is aligned with the hole 505a of the first PCB 505. The first aperture 521 forms a portion of the first cavity 502. That is, the external sound of the flexible display device 1 is transmitted to the first microphone 501 through the first aperture 521 and the holes 505a of the first PCB 505.

The first inner adjustment groove 523 extends in the first direction (X direction) from the first aperture 521.

The first inner adjustment groove 523 may be formed in a concave groove shape in an outer surface or an inner surface of the first gasket 520, or may be formed in a hole or groove shape that penetrates the first gasket 520 inward and outward (in a third direction (Z direction)).

The first inner adjustment groove 523 may have a constant cross section along the first direction (X direction). The cross section of the first inner adjustment groove 523 may have a rectangular shape.

The width of the first inner adjustment groove 523 may be greater than the diameter of the first aperture 521.

The width and cross-sectional size of the first inner adjustment groove 523 may be variously formed in consideration of the acoustic characteristics of the first microphone 501.

The width and cross-section of the first inner adjustment groove 523 may be the same as the width and cross-section of the first outer adjustment groove 513. That is, when the first gasket 520 is seated in the first seating space 512 and coupled to the first frame 510, the first inner adjustment groove 523 and the first outer adjustment groove 513 may be connected to each other without a stepped portion.

The length of the first inner adjustment groove 523 may be smaller than the movement range (i.e., a stroke and the length between the first position and the second position) of the second body 200b relative to the first body 200a. The length of the first inner adjustment groove 523 may be equal to or smaller than ½ of the movement range (i.e., the stroke) of the second body 200b relative to the first body 200a.

The first inner adjustment groove 523 extends from the first aperture 521 to an end of the first gasket 520 in the first direction (X direction).

The first outer adjustment groove 513 and the first inner adjustment groove 523 are aligned with each other to form a first adjustment groove 503.

The first outer adjustment groove 513 and the first inner adjustment groove 523 form the first adjustment groove 503 together.

In the first direction (X direction), the sum of the length of the first outer adjustment groove 513 and the length of the first inner adjustment groove 523 becomes the length of the first adjustment groove 503. The length of the first adjustment groove 503 may be longer than that of the first adjustment bar 530.

The first adjustment groove 503 has a constant cross-sectional area along the first direction (X direction).

The first adjustment bar 530 is formed along the first direction (X direction). The first adjustment bar 530 is elongated along the first direction (X direction).

The first adjustment bar 530 may have a constant cross section along the first direction (X direction). The cross section of the first adjustment bar 530 may have a rectangular shape.

The first adjustment bar 530 is inserted into the first adjustment groove 503. A cross section of the first adjustment bar 530 in the first direction (X direction) may correspond to a cross section of the first adjustment groove 503. In the first direction (X direction), the cross section of the first adjustment bar 530 may be the same as the cross section of the first adjustment groove 503 (here, 'same' is 'same' within the range in which the first adjustment bar 530 can move relative to the first adjustment groove 503, and a case within the same range according to manufacturing tolerance is also applicable thereto).

A portion of the first adjustment bar 530 is fixed to the second body 200b. The first adjustment bar 530 may be integral with the second body 200b, and may be separately formed and then fixed to the second body 200b.

When the first body 200a and the second body 200b move relative to each other, the first adjustment bar 530 moves along with the second body 200b, and accordingly, the first adjustment bar 530 and the first body 200a move relative to each other. Accordingly, the degree to which the first adjustment bar 530 is inserted into the first adjustment groove 503 is changed.

The first variable cavity 504 may be a remaining space in which the first adjustment bar 530 is not inserted in the space formed by the first adjustment groove 503. When the first body 200a and the second body 200b move relative to each other, with an increase in the degree to which the first adjustment bar 530 is inserted into the first adjustment groove 503, the volume of the first variable cavity 504 decreases, and with a decrease in the degree to which the first adjustment bar 530 is inserted into the first adjustment groove 503, the volume of the first variable cavity 504 increases.

The support plate 230 is disposed outside the first frame 510 and the first gasket 520.

The support plate 230 may include a second aperture 231 and a first horizontal groove 232.

The second aperture 231 is a hole penetrating the support plate 230. The second aperture 231 penetrates the support plate 230 in the third direction (Z direction). The second aperture 231 is aligned with the first aperture 521. The second aperture 231 forms a portion of the first cavity 502.

The first horizontal groove 232 may have a concave groove shape on an outer surface of the support plate 230. The first horizontal groove 232 extends from the second aperture 231 in a direction parallel to the first region. The first horizontal groove 232 may extend from the second aperture 231 to the edge of the flexible display (i.e., the first region). The first horizontal groove 232 may extend from the second aperture 231 in a direction parallel to the second direction (Y direction).

The first horizontal groove 232 may have a constant cross section along a formation direction thereof. The cross section of the first horizontal groove 232 may have a rectangular shape.

The width of the first horizontal groove 232 may have the same size as the diameter of the second aperture 231.

The width and cross-sectional size of the first horizontal groove 232 may be variously formed in consideration of the acoustic characteristics of the first microphone 501.

The first horizontal groove 232 forms a portion of the first cavity 502.

A first inlet 233 may be formed at an end of the first horizontal groove 232, and the first inlet 233 may form an inlet of the first cavity 502. The external sound may be transferred to the inside of the first cavity 502 through the first inlet 233.

The external sound of the flexible display device 1 is transmitted to the first microphone 501 through the first inlet 233, the first horizontal groove 232, the second aperture 231, the first aperture 521, and the hole 505a of the first PCB 505.

FIG. 12a is a cross-sectional perspective view illustrating a portion of the configuration of the flexible display device 1 in the first state and is a cross-sectional perspective view illustrating the configuration of FIG. 10b when viewed in another direction.

FIG. 12b is a graph illustrating sound characteristics for each frequency in the first cavity 502 of FIG. 12a.

FIG. 13a is a cross-sectional perspective view illustrating a partial configuration of the flexible display device 1 between the first state and the second state and is a cross-sectional perspective view illustrating a state in which a portion of the configuration of FIG. 12a moves.

FIG. 13b is a graph illustrating sound characteristics for each frequency in the first cavity 502 of FIG. 13a.

FIG. 14a is a cross-sectional perspective view illustrating a portion of configuration of the flexible display device 1 in the second state and is a cross-sectional perspective view illustrating a state in which a portion of the configuration of FIG. 13a moves.

FIG. 14b is a graph illustrating sound characteristics for each frequency in the first cavity 502 in FIG. 14a.

In each attached graph of the present disclosure, a vertical axis represents a sound pressure level (SPL) (a unit is decibel (dB)).

Hereinafter, in the flexible display device 1 according to one embodiment of the present disclosure, acoustic characteristics (resonance characteristics) in the first cavity 502 will be described.

Helmholtz resonance is known in relation to resonance phenomena in the cavity. According to the Helmholtz resonance calculation formula, the resonance frequency increases as the area of an opening of a cavity increases, and the resonance frequency decreases as the volume of the cavity increases.

When the flexible display device 1 is in the first state (when the second body 200b is in the first position), the degree to which the first adjustment bar 530 is inserted into the first adjustment groove 503 may be the largest. In this case, the first variable cavity 504 is minimized. In one embodiment, when the flexible display device 1 is in the first state (when the second body 200b is in the first position), the first adjustment bar 530 may be completely inserted into the first adjustment groove 503. That is, in this case, the volume of the first variable cavity 504 may be substantially 0 (zero) or close to 0.

Since the external sound of the flexible display device 1 is transmitted to the first microphone 501 through the first cavity 50, and the combined volume of the first cavity 502 and the first variable cavity 504 is minimized, the resonance frequency may be relatively the largest.

As a result of simulating the acoustic characteristics (resonance characteristics) of the flexible display device 1 according to one embodiment of the present disclosure, the resonance frequency in the first cavity 502 was found to be about 12.8 kHz in the first state (the first position). That is, it exhibits characteristics suitable for receiving and recording sound in the band of about 13 kHz.

When the second body 200b moves relative to the first body 200a in the first direction (X direction), the degree to which the first adjustment bar 530 is inserted into the first adjustment groove 503 gradually decreases. Accordingly, the volume of the first variable cavity 504 gradually increases.

As a result of simulating the acoustic characteristics (resonance characteristics) of the flexible display device 1 according to one embodiment of the present disclosure, when the flexible display device 1 was in the middle of the first state and the second position (in the middle of the first state and the second state), the resonance frequency in the first cavity 502 was about 4.7 kHz. That is, it exhibits characteristics suitable for receiving and recording sound in a band of about 5 kHz. It may be understood that this is because the volume of the first variable cavity 504 increases, and the increased volume of the first variable cavity 504 merges with the volume of the first cavity 502 to change characteristics of the resonance frequency of the first cavity 502.

When the second body 200b moves relative the first body 200a in the first direction (X direction) and the flexible display device 1 is in the second position (when the second body 200b is in the second position), the degree to which the first adjustment bar 530 is inserted into the first adjustment groove 503 may be the smallest. In this case, the first variable cavity 504 is maximized.

As a result of simulating the acoustic characteristics (resonance characteristics) of the flexible display device 1 according to one embodiment of the present disclosure, when the flexible display device 1 was in the second state (i.e., the second position), the resonance frequency in the first cavity 502 was about 3.2 kHz. That is, it exhibits characteristics suitable for receiving and recording sound in a band of about 3 kHz. It may be understood that the volume of the first variable cavity 504 further increases to be maximized, and the increased volume of the first variable cavity 504 merges with the volume of the first cavity 502 to change the characteristics of the resonance frequency of the first cavity 502.

The resonance characteristics in the first cavity 502 vary depending on each state (e.g., the first state, the second state, or a state between the first state and the second state) of the flexible display device 1 according to the embodiment of the present disclosure, or depending on the first position, the second position, or a position between the first position and the second position of the second body 200b.

Accordingly, in the flexible display device 1 according to the embodiment of the present disclosure, the sound in various frequency ranges can be received, and the flexible display device 1 can be modified and used so as to be in a state (or a position) suitable for sound in a specific frequency range.

According to the flexible display device 1 according to one embodiment of the present disclosure, the first variable cavity 504 may be adjusted to be suitable for receiving a sound frequency of a specific band, and the sensitivity (or recording sensitivity) of the first microphone 501 can be improved.

In addition, as the flexible display device 1 varies between the first state (i.e., the first position) and the second state (i.e., the second position), the user can record the sound of a desired band loudly.

As described above, the flexible display device 1 includes the controller 180.

The controller 180 may be configured to identify the position of the second body 200b relative to the first body 200a based on the change in the resonance frequency in the first cavity 502 according to the change in the volume of the first variable cavity 504.

As described above, the resonance frequency in the first cavity 502 is changed depending on the position of the second body 200b relative to the first body 200a. The controller 180 may determine whether the second body 200b is in the first position or the second position, or between the first position and the second position by detecting these different resonant frequencies.

The controller 180 may be configured to control the flexible display device 1 such that the first mode operates when the second body 200b is in the first position.

The controller 180 may be configured to control the flexible display device 1 such that the second mode operates when the second body 200b is in the second position.

The controller 180 may be configured to control the flexible display device 1 such that the third mode operates when the second body 200b is between the first position and the second position.

The first mode and the second mode may be different modes. The first mode, the second mode, and the third mode may be different modes.

In one embodiment, whether a specific function of the flexible display device 1 operates may or may not be possible depending on each mode (i.e., the first mode, the second mode, and the third mode).

In one embodiment, an interface implemented on a display may be differently configured according to each mode (i.e., the first mode, the second mode, and the third mode).

In one embodiment, the type and scope of available applications (application software stored in the flexible display device 1) may vary depending on each mode (i.e., the first mode, the second mode, and the third mode).

In one embodiment, a call scheme may vary according to each mode (i.e., the first mode, the second mode, and the third mode).

In one embodiment, when the mode is switched to the first mode, a call through the flexible display device 1 may be made by means of a handset call, the application the user is using may be terminated, a display screen lock (limiting input from the touch panel) may be performed, the display may be switched to a desktop when a home screen and the desktop of the display are switchable, or the display screen may be scrolled up.

In one embodiment, when the mode is switched to the second mode, a call through the flexible display device 1 may be made through a speaker phone, a specific application (which may be predetermined by the user) may be executed, the display may be switched to a home screen when the home screen and a desktop of the display are switchable, or the display screen may be scrolled down.

In one embodiment, when the mode is switched to the third mode, a specific application (which may be predetermined by the user) may be executed or the scroll of the display screen may be held.

FIG. 15a is a perspective view illustrating a partial configuration of the flexible display device 1 region 2 of FIG. 2a cut along the first direction (X direction) and the second direction (Y direction). A portion of the cut surface illustrated in FIG. 15a is perpendicular to the first direction (X direction), and the other portion is perpendicular to the second direction (Y direction). In FIG. 15a, some components are illustrated separately. In FIG. 15a, a portion 260a of the fourth side edge portion 260 is excluded.

FIG. 15b is a view illustrating an assembled state of the components of FIG. 15a and is a cross-sectional perspective view taken along line C-C' of FIG. 15a.

The flexible display device 1 includes a second cavity 602 and a second variable cavity 604.

The second microphone 601 is disposed inside the flexible display device 1.

The second cavity 602 is an inner space of the flexible display device 1 and forms an acoustic path as a passage extending from the second microphone 601 to the outside of the flexible display device 1. The external sound of the flexible display device 1 may be transmitted to the second microphone 601 through the second cavity 602.

The second variable cavity 604 is a space inside the flexible display device 1.

In one embodiment of the present disclosure, a space formed by the second variable cavity 604 is changed. That is, the volume of the second variable cavity 604 is changed.

The second variable cavity 604 is a space extending from the second cavity 602. That is, the second cavity 602 and the second variable cavity 604 communicate with each other and form the inner space of the flexible display device 1.

When the second body 200b moves relative to the first body 200a, the volume of the second variable cavity 604 is changed. In one embodiment, the volume of the second variable cavity 604 may be minimized when the second body 200b is in the first position, and the volume of the second variable cavity 604 may be maximized when the second body 200b is in the second position.

In one embodiment, the volume of the second variable cavity 604 may be configured to vary in a direction parallel to the first direction (X direction).

In one embodiment, the second microphone 601 may be disposed in the first body 200a. When the first body 200a and the second body 200b move relative to each other, the second microphone 601 does not move relative to the first body 200a, but moves relative to the second body 200b.

In another embodiment, the second microphone 601 may be disposed on the second body 200b. When the first body 200a and the second body 200b move relative to each other, the second microphone 601 does not move relative to the second body 200b, but moves relative to the first body 200a.

Hereinafter, a case in which the second microphone 601 is arranged in the first body 200a will be described.

When the second microphone 601 is disposed in the first body 200a, the second microphone 601 may be fixed to the first body 200a. The second microphone 601 may be directly fixed to the first body 200a or may be fixed to the first body 200a by another means.

The flexible display device 1 includes a second gasket 620 and a second adjustment bar 630. In addition, the flexible display device 1 includes a second frame 610.

The second frame 610 may include a second accommodation space 611, a second seating space 612, and a second outer adjustment groove 613. Each of the second accommodation space 611, the second seating space 612, and the second outer adjustment groove 613 is a space formed in the second frame 610.

The second frame 610 may be integral with the first body 200a. The second frame 610 may be separated from the first body 200a and then fixed to the first body 200a.

When the flexible display device 1 is in the first state, the second frame 610 may be disposed closer to the second edge portion 206 than the first edge portion 205. In the first state (or the first position), when the first edge portion 205 forms an upper part of the flexible display device 1 and the second edge portion 206 forms a lower part of the flexible display device 1, the second frame 610 may be formed in the lower part of the flexible display device 1.

The second frame 610 may be fixed to the first body 200a ahead of the first direction (X direction) or may be integral with the first body 200a. The second frame 610 may be fixed to the first body 200a at the foremost side of the first direction (X direction) or may be integral with the first body 200a.

The second accommodation space 611 is an inner space of the second frame 610 and is configured to accommodate the second microphone 601.

The second seating space 612 is provided outside the second accommodation space 611. The second seating space 612 may have a concave groove shape recessed in the outer surface of the second frame 610. The second gasket 620 is accommodated in the second seating space 612. In the third direction (Z direction), the second seating space 612 may be formed ahead of the second accommodation space 611.

In the flexible display device 1, a printed circuit board (PCB) may be provided for mounting the second microphone 601. The second microphone 601 is mounted on the inner surface of a second PCB 605. The second PCB 605 may be provided between the second accommodation space 611 and the second seating space 612. The second PCB 605 is first seated in the second seating space 612 in a form of shielding the second accommodation space 611, and the second gasket 620 is disposed on an outer surface of the second PCB 605.

A small aperture 605b is formed in the second PCB 605, and the small aperture 605b forms a portion of the second cavity 602. That is, the external sound of the flexible display device 1 is transmitted to the second microphone 601 through the hole 605b of the second PCB 605.

The second outer adjustment groove 613 may have a concave groove shape in the outer surface of the second frame 610. The second outer adjustment groove 613 extends from the second seating space 612 in the first direction (X direction).

The second outer adjustment groove 613 may have a constant cross section along the first direction (X direction). The cross section of the second outer adjustment groove 613 may have a rectangular shape.

The width of the second outer adjustment groove 613 is smaller than that of the second seating space 612.

The width and cross-sectional size of the second outer adjustment groove 613 may be variously formed in consideration of the acoustic characteristics of the second microphone 601.

The length of the second outer adjustment groove 613 may be smaller than the movement range (the stroke and the length between the first position and the second position) of the second body 200b relative to the first body 200a. The length of the second outer adjustment groove 613 may be equal to or similar to ½ of the movement range (e.g., the stroke) of the second body 200b relative to the first body 200a.

The second outer adjustment groove 613 extends from the second seating space 612 to an end of the second frame 610 in the first direction (X direction).

The second gasket 620 is seated in the second seating space 612. The second gasket 620 is inserted to fit the second seating space 612. An outer edge of the second gasket 620 inserted into the second seating space 612 is in close contact with the second frame 610, and the second gasket 620 seals the second microphone 601.

The second gasket 620 includes a third aperture 621 and a second inner adjustment groove 623.

The third aperture 621 is a hole penetrating the second gasket 620. The third aperture 621 penetrates the second gasket 620 in the third direction Z. The third aperture 621 may be formed in a substantially center of the second gasket 620. The third aperture 621 is aligned with the hole 605b of the second PCB 605. The third aperture 621 forms a portion of the second cavity 602. That is, the external sound of the flexible display device 1 is transmitted to the second microphone 601 through the hole 605b of the third aperture 621 and the second PCB 605.

The second inner adjustment groove 623 extends from the third aperture 621 in the first direction (X direction).

The second inner adjustment groove 623 may be formed in a concave groove shape on an outer surface or an inner surface of the second gasket 620, or may be formed in a hole or groove shape that penetrates the second gasket 620 inward and outward (in a third direction (Z direction)).

The second inner adjustment groove 623 may have a constant cross section along the first direction (X direction). The cross section of the second inner adjustment groove 623 may have a rectangular shape.

The width of the second inner adjustment groove 623 may be greater than the diameter of the third aperture 621.

The width and cross-sectional size of the second inner adjustment groove 623 may be variously formed in consideration of the acoustic characteristics of the second microphone 601.

The width and cross-section of the second inner adjustment groove 623 may be the same as the width and cross-section of the second outer adjustment groove 613. That is, when the second gasket 620 is seated in the second seating space 612 and coupled to the second frame 610, the second inner adjustment groove 623 and the second outer adjustment groove 613 may be connected to each other without a stepped portion.

The length of the second inner adjustment groove 623 may be smaller than the movement range (e.g., the stroke and the length between the first position and the second position) of the second body 200b relative to the first body 200a. The length of the second inner adjustment groove 623 may be equal to or smaller than ½ of the movement range (e.g., the stroke) of the second body 200b relative to the first body 200a.

The second inner adjustment groove 623 extends from the third aperture 621 to an end of the second gasket 620 in the first direction (X direction).

The second outer adjustment groove 613 and the second inner adjustment groove 623 are aligned with each other to form a second adjustment groove 603.

The second outer adjustment groove 613 and the second inner adjustment groove 623 form the second adjustment groove 603 together.

In the first direction (X direction), the sum of the length of the second outer adjustment groove 613 and the length of the second inner adjustment groove 623 becomes the length of the second adjustment groove 603. The length of the second adjustment groove 603 may be longer than the length of the second adjustment bar 630.

The second adjustment groove 603 has a constant cross-sectional area along the first direction (X direction).

The second adjustment bar 630 is formed along the first direction (X direction). The second adjustment bar 630 is elongated along the first direction (X direction).

The second adjustment bar 630 may have a constant cross section along the first direction (X direction). The cross section of the second adjustment bar 630 may have a rectangular shape.

The second adjustment bar 630 is inserted into the second adjustment groove 603. A cross section of the second adjustment bar 630 in the first direction (X direction) may correspond to a cross section of the second adjustment groove 603. In the first direction (X direction), the cross section of the second adjustment bar 630 may be the same as the cross section of the second adjustment groove 603 (here, 'same' is 'same' in the range where the second adjustment bar 630 can move relative to the second adjustment groove 603, and a case within the same range according to manufacturing tolerance is also applicable thereto).

A portion of the second adjustment bar 630 is fixed to the second body 200b. The second adjustment bar 630 may be integral with the second body 200b, and when the second adjustment bar 630 is separated from the second body 200b, the second adjustment bar 630 may be fixed to the second body 200b.

When the first body 200a and the second body 200b move relative to each other, the second adjustment bar 630 moves along with the second body 200b, and accordingly, the second adjustment bar 630 and the first body 200a move relative to each other. Accordingly, the degree to which the second adjustment bar 630 is inserted into the second adjustment groove 603 is changed.

The second variable cavity 604 may be a remaining space in which the second adjustment bar 630 is not inserted, in the space formed by the second adjustment groove 603. When the first body 200a and the second body 200b moves relative to each other, with an increase in the degree of insertion of the second adjustment bar 630 into the second adjustment groove 603, the volume of the second variable cavity 604 decreases, and with a decrease in the degree of insertion of the second adjustment bar 630 into the second adjustment groove 603 decreases, the volume of the second variable cavity 604 increases.

The support plate 230 is disposed outside the second frame 610 and the second gasket 620.

The support plate 230 may include a fourth aperture 235 and a second horizontal groove 236.

The fourth aperture 235 is a hole penetrating the support plate 230. The fourth aperture 235 penetrates the support plate 230 in the third direction Z. The fourth aperture 235 is aligned with the third aperture 621. The fourth aperture 235 forms a portion of the second cavity 602.

The second horizontal groove 236 may have a concave groove shape in the outer surface of the support plate 230. The second horizontal groove 236 extends from the fourth aperture 235 in a direction parallel to the first region. The second horizontal groove 236 may extend from the fourth aperture 235 to an edge of the flexible display (i.e., the first region). The second horizontal groove 236 may extend from the fourth aperture 235 in a direction parallel to the second direction (Y direction).

The second horizontal groove 236 may have a constant cross section along a formation direction thereof. The cross section of the second horizontal groove 236 may have a rectangular shape.

The width of the second horizontal groove 236 may have the same size as the diameter of the fourth aperture 235.

The width and cross-sectional size of the second horizontal groove 236 may be variously formed in consideration of the acoustic characteristics of the second microphone 601.

The second horizontal groove 236 forms a portion of the second cavity 602.

A second inlet 237 may be formed at an end of the second horizontal groove 236, and the second inlet 237 may form an inlet of the second cavity 602. The external sound may be transmitted to the inside of the second cavity 602 through the second inlet 237.

The external sound of the flexible display device 1 is transmitted to the second microphone 601 through the second inlet 237, the second horizontal groove 236, the fourth aperture 235, the third aperture 621 and the hole 605b of the second PCB 605.

In one embodiment of the present disclosure, the first variable cavity 504 may be disposed adjacent to the first side edge portion 210 and the second variable cavity 604 may be disposed adjacent to the second side edge portion 220.

The first variable cavity 504 and the second variable cavity 604 may be asymmetric with respect to a reference surface CS.

FIG. 16a is a view illustrating a perspective view of the flexible display device 1 in the first state and is a cross-sectional perspective view illustrating an enlarged portion thereof.

FIG. 16b is a graph illustrating the sound characteristics for each frequency in the first cavity 502 and the sound characteristics for each frequency in the second cavity 602 in FIG. 16a.

FIG. 17a is a perspective view of the flexible display device 1 in a state in which the second body 200b moves in the first direction (X direction) in FIG. 16a and is a cross-sectional perspective view illustrating an enlarged portion thereof.

FIG. 17b is a graph showing the sound characteristics for each frequency in the first cavity 502 and the sound characteristics for each frequency in the second cavity 602 in FIG. 17a.

Hereinafter, in the flexible display device 1 according to one embodiment of the present disclosure, the acoustic characteristics (resonance characteristics) in the second cavity 602 will be described.

When the flexible display device 1 is in the first state (when the second body 200b is in the first position), the degree to which the second adjustment bar 630 is inserted into the second adjustment groove 603 may be the largest. In this case, the second variable cavity 604 is minimized.

Since the external sound of the flexible display device 1 is transmitted to the second microphone 601 through the second cavity 602 and the combined volume of the second cavity 602 and the second variable cavity 604 is minimized, the resonance frequency may represent relatively the largest value in the second variable cavity 604.

When the second body 200b moves relative to the first body 200a in the first direction (X direction), the degree to which the second adjustment bar 630 is inserted into the second adjustment groove 603 gradually decreases. Accordingly, the volume of the second variable cavity 604 gradually increases, and the resonance frequency decreases in the second variable cavity 604.

When the second body 200b moves relative the first body 200a in the first direction (X direction) and the flexible display device 1 is in the second position (when the second body 200b is in the second position), the degree to which the second adjustment bar 630 is inserted into the second adjustment groove 603 may be the smallest, the second variable cavity 604 may be maximized, and the resonance frequency may represent relatively the smallest value in the second variable cavity 604.

As such, the resonance characteristics in the second cavity 602 vary depending on each state (i.e., the first state, the second state, or the state between the first state and the second state) of the flexible display device 1 according to one embodiment of the present disclosure, or depending on the first position, the second position, or the position between the first position and the second position of the second body 200b.

As described above, the resonance frequency in the second cavity 602 varies depending on the position of the second body 200b relative to the first body 200a. The controller 180 may determine whether the second body 200b is in the first position or the second position, or between the first position and the second position by detecting these different resonant frequencies.

The controller 180 according to one embodiment of present disclosure may selectively combine the resonance frequency in the first cavity 502 and the resonance frequency in the second cavity 602 and determine a state of the flexible display or a relative position of the second body 200b.

In one embodiment of present disclosure, the first variable cavity 504 and the second variable cavity 604 may have different volumes at the same time. In addition, the first cavity 502 and the second cavity 602 may be the same as each other or may be symmetrical with respect to the reference surface CS.

In one embodiment, the first variable cavity 504 may always be smaller than the second variable cavity 604. In another embodiment, the first variable cavity 504 may always be larger than the second variable cavity 604.

Hereinafter, a case in which the first cavity 502 and the second cavity 602 are symmetrical with respect to the reference plane CS, and the first variable cavity 504 is formed smaller than the second variable cavity 604 will be described. To this end, in the flexible display device 1 according to one embodiment, the length of the first adjustment bar 530 in the first direction (X direction) may be formed longer than the length of the second adjustment bar 630.

In the first state (the first position), resonance frequency $\hat{1}$ in the first cavity 502 may be formed greater than resonance frequency $\hat{2}$ in the second cavity 602.

FIG. 16b illustrates the simulation results of the acoustic characteristics (resonance characteristics) of the flexible display device 1 according to one embodiment of the present disclosure, and exhibits the frequency characteristics $\hat{1}$ in the first cavity 502, the frequency characteristics $\hat{2}$ in the second cavity 602, and the combined frequency characteristics thereof $\hat{3}$ in the first state (the first position).

As such, the resonance frequency in the first cavity 502 is different from the resonance frequency in the second cavity 602.

In the flexible display device 1, since the sound may be received through each of the first microphone 501 and the second microphone 601, the resonance frequency in the first cavity 502 and the resonance frequency in the second cavity 602 can be combined to expand the bandwidth of the frequency.

In the second state (the second position), the resonance frequency in the first cavity 502 may be larger than the resonance frequency in the second cavity 602. However, the difference between the resonance frequency in the first cavity 502 and the resonance frequency in the second cavity 602 in the second state (the second position) may be smaller than the difference between the resonance frequency in the first cavity 502 and the resonance frequency in the second cavity 602 in the first state (the second position).

FIG. 17b illustrates the simulation results of the acoustic characteristics (resonance characteristics) of the flexible display device 1 according to one embodiment of the present disclosure, and exhibits frequency characteristics $\hat{4}$ in the first cavity 502, frequency characteristics $\hat{5}$ in the second cavity 602, and the combined frequency characteristics thereof $\hat{6}$ in the second state (the second position).

As such, the resonance frequency in the first cavity 502 may be different from the resonance frequency in the second cavity 602, and the resonance frequency in the first cavity 502 and the resonance frequency in the second cavity 602 may be combined to expand the bandwidth of the frequency.

In addition, each resonance frequency varies when the flexible display device 1 varies between the first state (the first position) and the second state (the second position).

While the specific exemplary embodiments of the present invention have been described and illustrated, it is obvious to those skilled in the art that the present disclosure is not limited to the aforementioned exemplary embodiments, and may be variously changed and modified without departing from the spirit and the scope of the present disclosure. Therefore, the scope of the present disclosure should not be appreciated individually from the technical spirit or prospect of the embodiments described above, and belong to the claims of the present invention.

INDUSTRIAL APPLICABILITY

The industrial applicability of the flexible display device according to the embodiment of the present invention is obvious in that each state of the flexible display device can be detected using the acoustic characteristics according to a change in the inner space during the relative movement between the first body and the second body, and the sensitivity of the microphone can be improved.

The invention claimed is:
1. A flexible display device, comprising:
a first body;
a second body configured to move parallel to a first direction relative to the first body;
a flexible display including a first region fixed to the first body, and a second region extending from the first region and coupled to the second body, and deformed when the second body moves relative to the first body;
a first microphone disposed inside the flexible display device;
a first cavity configured to form an acoustic path as a passage extending from the first microphone to the outside of the flexible display device; and
a first variable cavity extending from the first cavity inside the flexible display device, wherein a volume thereof is changed when the second body moves relative to the first body.
2. The flexible display device of claim 1, wherein the first variable cavity is configured such that a volume thereof is changed in a direction parallel to the first direction.
3. The flexible display device of claim 1, wherein the first microphone is disposed in the first body, and
the flexible display device includes:
a first gasket provided with a first aperture forming a portion of the first cavity and a first inner adjustment groove extending from the first aperture and forming all or part of the first variable cavity, and disposed outside the first microphone; and
a first adjustment bar formed along the first direction, of which one portion is inserted into the first inner adjustment groove and of which the other portion is fixed to the second body.
4. The flexible display device of claim 3, further comprising:
a first frame provided with a first accommodation space configured to accommodate the first microphone, a first seating space provided outside the first accommodation space and configured to accommodate the first gasket, and a first outer adjustment groove extending from the first seating space and aligned with the first inner adjustment groove, wherein the first frame is fixed to the first body, wherein the first outer adjustment groove and the first inner adjustment groove form a first adjustment groove together, and the degree to which the first adjustment bar is inserted into the first adjustment groove is changed.

5. The flexible display device of claim 3, further comprising a support plate provided with a second aperture forming a portion of the first cavity and aligned with the first aperture and a first horizontal groove extending from the second aperture in a direction parallel to the first region to form a portion of the first cavity, wherein the support plate is fixed to the first body and supports an inner surface of the first region.

6. The flexible display device of claim 5, wherein a formation direction of the first horizontal groove is parallel to a second direction perpendicular to the first direction.

7. The flexible display device of claim 1, wherein the flexible display device includes:
- a second microphone disposed inside the flexible display device;
- a second cavity configured to form an acoustic path as a passage extending from the second microphone to the outside of the flexible display device; and
- a second variable cavity extending from the second cavity inside the flexible display device, wherein a volume thereof is changed when the second body moves relative to the first body.

8. The flexible display device of claim 7, wherein each of the first variable cavity and the second variable cavity is configured such that a volume there of is changed in a direction parallel to the first direction, and
the first variable cavity and the second variable cavity are configured to have different volumes at the same time.

9. The flexible display device of claim 7, wherein the first body includes:
- a first side edge portion and a second side edge portion disposed on opposite sides facing the first region, respectively, with respect to a reference surface crossing the first body and the second body in a direction parallel to the first direction, and formed in the first direction, and
- the first variable cavity is disposed adjacent to the first side edge portion, and the second variable cavity is disposed adjacent to the second side edge portion.

10. The flexible display device of claim 7, wherein the first microphone and the second microphone are disposed in the first body, and
the flexible display device includes:
- a first gasket provided with a first aperture forming a portion of the first cavity and a first inner adjustment groove extending from the first aperture and forming all or part of the first variable cavity, and disposed outside the first microphone;
- a first adjustment bar formed along the first direction, of which one portion is inserted into the first inner adjustment groove and of which the other portion is fixed to the second body,
- a second gasket provided with a third aperture forming a portion of the second cavity and a second adjustment groove extending from the third aperture and forming all or part of the second variable cavity, and disposed outside the second microphone; and
- a second adjustment bar formed along the first direction, of which one portion is inserted into the second inner adjustment groove and of which the other portion is fixed to the second body.

11. The flexible display device of claim 10, further comprising:
- a first frame provided with a first accommodation space configured to accommodate the first microphone, a first seating space provided outside the first accommodation space and configured to accommodate the first gasket, and a first outer adjustment groove extending from the first seating space and aligned with the first inner adjustment groove, wherein the first frame is fixed to the first body; and
- a second frame provided with a second accommodation space configured to accommodate the second microphone, a second seating space provided outside the second accommodation space and configured to accommodate the second gasket, and a second outer adjustment groove extending from the second seating space and aligned with the second inner adjustment groove, wherein the second frame is fixed to the first body, wherein the first outer adjustment groove and the first inner adjustment groove form a first adjustment groove together, the second outer adjustment groove and the second inner adjustment groove form a second adjustment groove together, the degree to which the first adjustment bar is inserted into the first adjustment groove is changed, and the degree to which the second adjustment bar is inserted into the second adjustment groove is changed.

12. The flexible display device of claim 11, wherein the flexible display device includes a support plate provided with a second aperture configured to form a portion of the first cavity and communicate with the first aperture, a first horizontal groove extending from the second aperture in a direction parallel to the first region to form a portion of the first cavity, a fourth aperture configured to form a portion of the second cavity and communicate with the third aperture, and a second horizontal groove extending from the fourth aperture in a direction parallel to the first region to form a portion of the second cavity, wherein the support plate is fixed to the first body and supports the inner surface of the first region.

13. The flexible display device of claim 7, wherein the flexible display device includes a controller configured to identify a position of the second body relative to the first body based on a change in a resonance frequency of the first cavity according to a change in the volume of the first variable cavity and a change in a resonance frequency of the second cavity according to a change in the volume of the second variable cavity.

14. The flexible display device of claim 7, wherein the resonance frequency of the first cavity and the resonance frequency of the second cavity are different from each other, and
the sensitivity of the first microphone is combined with the sensitivity of the second microphone.

15. The flexible display device of claim 1, wherein the flexible display device includes a controller configured to identify a position of the second body relative to the first body based on a change in a resonance frequency in the first cavity according to a change in the volume of the first variable cavity.

16. The flexible display device of claim 13, wherein the second body moves between a first position and a second position relative to the first body,
the controller is configured to, when the second body is in the first position, control the flexible display device such that a first mode operates, when the second body is in the second position, control the flexible display device such that a second mode operates, and when the second body is between the first position and the second position, control the flexible display device such that a third mode operates.

17. A flexible display device provided with a first microphone disposed inside and a first cavity forming an acoustic path extending externally from the first microphone, the flexible display device comprising:

a first body in which the first microphone is disposed;

a second body configured to move between a first position and a second position in a direction to parallel to a first direction relative to the first body;

a flexible display including a first region fixed to the first body and a second region extending from the first region and coupled to the second body;

a first gasket provided with a first aperture forming a portion of the first cavity and a first inner adjustment groove extending from the first aperture in a direction parallel to the first direction, and disposed outside the first microphone, and a first adjustment bar formed along the first direction, of which one portion is inserted into the first inner adjustment groove and of which the other portion is fixed to the second body.

18. The flexible display device of claim 17, further comprising:

a first frame provided with a first accommodation space configured to accommodate the first microphone, a first seating space provided outside the first accommodation space and configured to accommodate the first gasket, and a first outer adjustment groove extending from the first seating space and aligned with the first inner adjustment groove, wherein the first frame is fixed to the first body, wherein the first outer adjustment groove and the first inner adjustment groove are connected to form a first adjustment groove, and the degree to which the first adjustment bar is inserted into the first adjustment groove is changed.

19. The flexible display device of claim 17, further comprising:

a second microphone disposed in the first body inside the flexible display device;

a second cavity configured to form an acoustic path as a passage extending from the second microphone to the outside of the flexible display device;

a second gasket provided with a third aperture forming a portion of the second cavity and a second inner adjustment groove extending from third aperture in a direction parallel to the first direction, wherein the second gasket is disposed outside the second microphone; and a second adjustment bar formed along the first direction, of which a portion is inserted into the second inner adjustment groove and of which the other part is fixed to the second body.

20. The flexible display device of claim 17, further comprising:

a plurality of support bars elongated in a direction parallel to the first region and parallel to a second direction perpendicular to the first direction and fixed to an inner surface of the second region, wherein the support bar includes:

a first support slider configured to form one end of the support bar;

a second support slider configured to form one end of the support bar on an opposite side of the first support slider; and a connection arm configured to connect the first support slider and the second support slider and support the second region, and the second body includes:

a first movement guide groove configured in a U-shaped groove to form a path through which the first support slider is inserted and moved; and a second movement guide groove configured in a U-shaped groove to form a path through which the second support slider is inserted and moved.

* * * * *